(12) United States Patent
Abdollahian

(10) Patent No.: US 11,828,940 B2
(45) Date of Patent: *Nov. 28, 2023

(54) SYSTEM AND METHOD FOR USER ALERTS DURING AN IMMERSIVE COMPUTER-GENERATED REALITY EXPERIENCE

(71) Applicant: Apple Inc., Cupertino, CA (US)

(72) Inventor: Golnaz Abdollahian, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 17/308,301

(22) Filed: May 5, 2021

(65) Prior Publication Data

US 2021/0256227 A1 Aug. 19, 2021

Related U.S. Application Data

(63) Continuation of application No. 16/435,690, filed on Jun. 10, 2019, now Pat. No. 11,002,965.

(Continued)

(51) Int. Cl.
*G10L 15/00* (2013.01)
*G02B 27/01* (2006.01)
(Continued)

(52) U.S. Cl.
CPC ....... *G02B 27/017* (2013.01); *G02B 27/0176* (2013.01); *G06F 16/9536* (2019.01); *G06F 40/295* (2020.01); *G06F 40/56* (2020.01); *G06Q 50/01* (2013.01); *G06V 10/143* (2022.01); *G06V 10/454* (2022.01); *G06V 10/764* (2022.01);
(Continued)

(58) Field of Classification Search
CPC ............. G10L 15/22; G10L 21/0202; G10L 2021/02166; G06K 9/00228; G06K 9/00288; G06K 9/00671; G06K 9/2018; G06K 9/4628; G06K 9/6269; G06K 9/6274; G02B 27/0176; G02B 2027/0138;
(Continued)

(56) References Cited

U.S. PATENT DOCUMENTS

| 5,712,658 A | 1/1998 | Arita et al. |
| 5,900,849 A | 5/1999 | Gallery |

(Continued)

FOREIGN PATENT DOCUMENTS

| CN | 105324811 A | 2/2016 |
| KR | 100952393 B1 | 4/2010 |

OTHER PUBLICATIONS

Tom's Hardware, "Using Steam VR's 'Knock Knock' Feature To Get Someone's Attention in VR", https://www.tomshardware.com/news/steamvr-beta-knock-knock-vive,31813.html, May 17, 2016 (3 pp).

*Primary Examiner* — Md S Elahee
(74) *Attorney, Agent, or Firm* — Young Basile Hanlon & MacFarlane, P.C.

(57) ABSTRACT

Systems and methods for computer-generated reality user hailing are described. Some implementations may include accessing sensor data captured using one or more sensors; detecting a person within a distance of a head-mounted display based on the sensor data; detecting a hail event based on the sensor data; and responsive to the hail event, invoking an alert using the head-mounted display.

20 Claims, 10 Drawing Sheets

Related U.S. Application Data

(60) Provisional application No. 62/689,458, filed on Jun. 25, 2018.

(51) Int. Cl.

| | |
|---|---|
| *G10L 15/22* | (2006.01) |
| *G06F 16/9536* | (2019.01) |
| *G06F 40/56* | (2020.01) |
| *G06F 40/295* | (2020.01) |
| *G06Q 50/00* | (2012.01) |
| *G06V 40/16* | (2022.01) |
| *G06V 10/764* | (2022.01) |
| *G06V 10/44* | (2022.01) |
| *G06V 10/143* | (2022.01) |
| *G06V 20/20* | (2022.01) |

(52) U.S. Cl.
CPC ............ *G06V 20/20* (2022.01); *G06V 40/161* (2022.01); *G06V 40/172* (2022.01); *G10L 15/22* (2013.01); *G02B 2027/0138* (2013.01)

(58) Field of Classification Search
CPC ...... G02B 2027/014; G02B 2027/0141; G02B 27/017; G01S 3/8083; G06T 19/006; G06F 3/011
USPC .............................................................. 704/9
See application file for complete search history.

(56) References Cited

U.S. PATENT DOCUMENTS

| | | | |
|---|---|---|---|
| 7,127,401 | B2 | 10/2006 | Miller |
| 7,676,372 | B1 | 3/2010 | Oba |
| 8,209,183 | B1 | 6/2012 | Patel et al. |
| 8,886,530 | B2 | 11/2014 | Nakadai |
| 9,043,211 | B2 | 5/2015 | Haiut et al. |
| 9,952,881 | B2 | 4/2018 | Sharma et al. |
| 10,055,887 | B1 | 8/2018 | Gil et al. |
| 10,535,199 | B1 | 1/2020 | Bond et al. |
| 2002/0103649 | A1 | 8/2002 | Basson et al. |
| 2013/0084970 | A1 | 4/2013 | Geisner et al. |
| 2014/0002496 | A1 | 1/2014 | Amb et al. |
| 2014/0055591 | A1 | 2/2014 | Katz |
| 2015/0006181 | A1 | 1/2015 | Fan et al. |
| 2015/0302867 | A1 | 10/2015 | Tomlin et al. |
| 2016/0025978 | A1 | 1/2016 | Mallinson |
| 2016/0261300 | A1 | 9/2016 | Fei et al. |
| 2016/0342840 | A1 | 11/2016 | Mullins et al. |
| 2017/0099481 | A1 | 4/2017 | Held et al. |
| 2017/0103574 | A1 | 4/2017 | Faaborg et al. |
| 2017/0123747 | A1 | 5/2017 | Rochford et al. |
| 2017/0185148 | A1 | 6/2017 | Kondo |
| 2017/0205892 | A1 | 7/2017 | Petrovskaya et al. |
| 2017/0249021 | A1 | 8/2017 | Henrique Barbosa Postal et al. |
| 2017/0326457 | A1 | 11/2017 | Tilton et al. |
| 2017/0337736 | A1 | 11/2017 | Cheng et al. |
| 2017/0359467 | A1 | 12/2017 | Norris et al. |
| 2017/0372499 | A1 | 12/2017 | Lalonde |
| 2018/0040212 | A1 | 2/2018 | Cheng et al. |
| 2018/0093176 | A1 | 4/2018 | Stafford |
| 2018/0188688 | A1 | 7/2018 | Maimone et al. |
| 2018/0196166 | A1 | 7/2018 | Zhang |
| 2018/0204375 | A1 | 7/2018 | Baek et al. |
| 2018/0318706 | A1 | 11/2018 | Nishimaki et al. |
| 2018/0373412 | A1 | 12/2018 | Reif |
| 2019/0041651 | A1 | 2/2019 | Kiemele et al. |
| 2019/0057689 | A1 | 2/2019 | Drazin |
| 2019/0070506 | A1 | 3/2019 | Stafford |
| 2019/0179511 | A1* | 6/2019 | Shimada ................ G06F 3/011 |
| 2019/0387102 | A1 | 12/2019 | Norris et al. |
| 2019/0392643 | A1 | 12/2019 | Busto et al. |
| 2019/0392830 | A1 | 12/2019 | Abdollahian |

* cited by examiner

SYSTEM AND METHOD FOR USER ALERTS DURING AN IMMERSIVE COMPUTER-GENERATED REALITY EXPERIENCE

CROSS-REFERENCE TO RELATED APPLICATIONS

This application is a continuation of U.S. patent application Ser. No. 16/435,690, filed on Jun. 10, 2019, entitled "System and Method for User Alerts During an Immersive Computer-Generated Reality Experience," which claims the benefit of U.S. Provisional Application No. 62/689,458, filed on Jun. 25, 2018, entitled "System and Method for User Alerts During an Immersive Computer-Generated Reality Experience," the content of which are incorporated herein by reference in its entirety for all purposes.

TECHNICAL FIELD

This disclosure relates to computer-generated reality user hailing.

BACKGROUND

Head-mounted displays are used to provide computer-generated reality experiences for users. Users of a head-mounted display may be subject to varying levels of immersion in a virtual or augmented environment. Head-mounted displays may present images and audio signals to a user, which, to varying degrees, may impair a user's ability to concurrently detect events in their physical surroundings.

SUMMARY

Disclosed herein are implementations of computer-generated reality user hailing.

In a first aspect, the subject matter described in this specification can be embodied in systems that include a head-mounted display, an image sensor configured to capture images of a vicinity of the head-mounted display, and a microphone configured to capture sound in a vicinity of the head-mounted display. The systems include a processing apparatus configured to access an image captured using the image sensor; detect, based at least in part on the image, a person within a distance of the head-mounted display; determine a view angle to the person; access an audio signal captured using the microphone; detect, based at least in part on the audio signal, a speech signal; determine a direction of arrival of the speech signal; compare the direction of arrival and the view angle; detect a hail event based on the comparison of the direction of arrival and the view angle; and responsive to the hail event, invoke an alert using the head-mounted display.

In a second aspect, the subject matter described in this specification can be embodied in systems that include a head-mounted display and an image sensor configured to capture images of a vicinity of the head-mounted display. The systems include a processing apparatus configured to access an image captured using the image sensor; detect, based at least in part on the image, a person within a distance of the head-mounted display; recognize, based at least in part on the image, a face of the person as associated with a known person of interest; detect a hail event based on the recognition of the face; and responsive to the hail event, invoke an alert using the head-mounted display.

In a third aspect, the subject matter described in this specification can be embodied in systems that include a head-mounted display and a microphone configured to capture sound in a vicinity of the head-mounted display. The systems include a processing apparatus configured to access an audio signal captured using the microphone; detect, based at least in part on the audio signal, a speech signal; recognize an audio trigger in the speech signal; detect a hail event based on recognition of the audio trigger; and responsive to the hail event, invoke an alert using the head-mounted display.

In a fourth aspect, the subject matter described in this specification can be embodied in systems that include a head-mounted display; an image sensor configured to capture images of a vicinity of the head-mounted display; a microphone configured to capture sound in a vicinity of the head-mounted display; and a processing apparatus. The processing apparatus may be configured to: access an image captured using the image sensor; detect, based at least in part on the image, a person within a distance of the head-mounted display; determine a view angle to the person; access an audio signal captured using the microphone; detect, based at least in part on the audio signal, a speech signal; determine a direction of arrival of the speech signal; detect whether a hail criteria is satisfied, wherein the hail criteria comprises a determination the person is speaking based on comparing the direction of arrival and the view angle; and responsive to a determination that the hail criteria is satisfied, invoke an alert using the head-mounted display. The processing apparatus may be configured to determine whether a face of the person in the image is associated with a person of interest, and the hail criteria may further include a determination that the face of the person in the image is associated with the person of interest. For example, determining whether the face of the person in the image is associated with a person of interest may include determining whether a probability of a match to a face of the person of interest exceeds a threshold probability. For example, a match probability may be estimated using a machine learning module (e.g., a convolutional neural network) that has been trained to recognize one or more faces of one or more known users.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
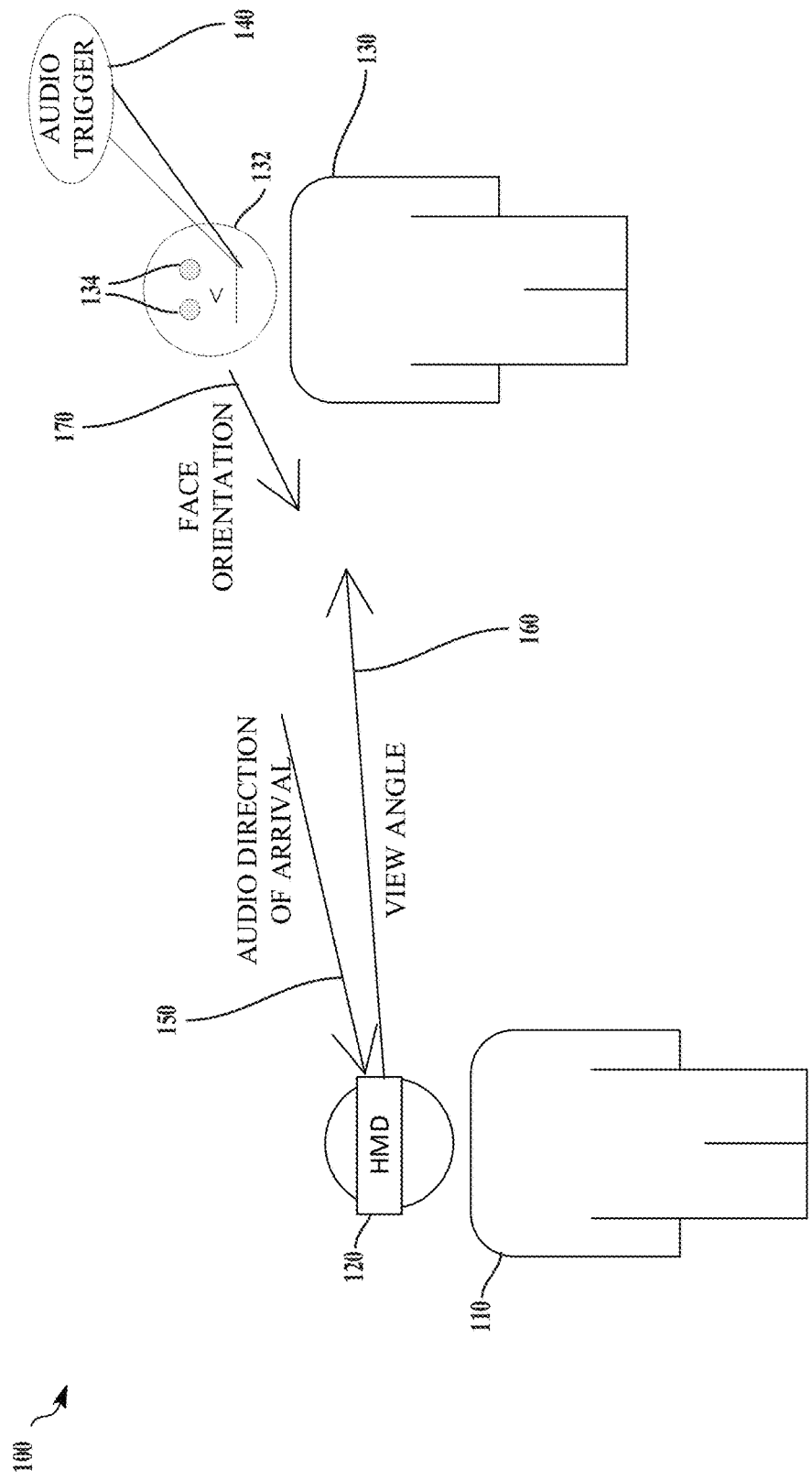
FIG. 1 is an illustration of an example of a hailing scenario.

A head-mounted display may be used to present a computer-generated reality application (e.g., including audio and video signals) to a user wearing the head-mounted display. While using a computer-generated reality application, a user's ability to sense and be aware of their physical surroundings can be substantially impaired. Using a computer-generated reality application could make it difficult for other people near the user to get the attention of the user. Systems and processes for facilitating the hailing of user immersed in computer-generated reality application are described herein.

The systems may include image sensors and/or microphones attached to the head-mounted display or positioned nearby so as to capture images and/or sound from a vicinity around the user wearing the head-mounted display. For example, data from these sensors may be analyzed to detect a person and/or indications that the person is trying to hail the user, e.g., to attract the attention of the user. For example, if the person speaks to the user, audio triggers (e.g., key phrases such as "hello," "excuse me," or a name of the user) can be recognized in the speech signal. In some implementations, a direction of arrival for a speech signal may be determined and compared to the view angle for the person to verify that the speech signal is coming from the nearby person. In some implementations, a face of the person (e.g., including one or more facial landmarks, such as a mouth, a nose, or pupils) may be detected recognized as matching a registered face of a known person (e.g., a friend or colleague of the user). In some implementations, the face can be detected and an orientation of the face with respect to the head-mounted display can be determined to assess whether the person is facing toward the user. In some implementations, eyes of the person can be analyzed more closely to determine a gaze direction, in order to assess whether the person is looking at the user.

Based on one or more of the indications of hailing described above in the sensor data, a hail event can be detected. When a hail event is detected, an alert may be presented to the user using the head-mounted display. For example, an audio alert message may be presented using headphones of the head-mounted display. For example, an alert image (e.g., text and/or an image of the person detected) may be presented using a head-mounted display. In some implementations, the audio and/or video of the computer-generated reality application may be transitioned to a transparent to enhance the ability of the user to sense and be aware the surrounding physical environment.

It is contemplated that some users may consider the faces of their friend or colleagues to be private information. Entities implementing the present technologies may consider implementations that do not transmit face data beyond the user's electronic device (or that at least reduces such transmissions). Risks may also be reduced by limiting the identification of such information. For example, the device may not require the identity (e.g., name) of the friend. The present disclosure also contemplates embodiments in which users selectively block the use of hailing features. In addition to providing "opt in" and "opt out" options, the present disclosure contemplates informing the user to the access or use of such information. For instance, a user may be notified at the time when she chooses to store the likeness of a friend (in order to enable the ability for the system to recognize the friend) that the system needs to store and later access that information to provide hail features. In any event, policies and practices should be adapted for the particular types of information data being collected and/or accessed and adapted to applicable laws and standards, including jurisdiction-specific considerations.

Using the described systems and processes for computer-generated reality hailing may provide advantages over some conventional systems for providing computer-generated reality experiences to users. For example, social experiences (e.g., gaming experiences) may be improved by allowing more natural interactions with people near the user during use of a computer-generated reality application.

Physical Environment

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-Generated Reality

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual Reality

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed Reality

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented Reality

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented Virtuality

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is an illustration of an example of a hailing scenario 100. In the hailing scenario 100, a user 110 is wearing a head-mounted display 120 that is implementing a computer-generated reality application. The computer-generated reality application may be partially or completely immersive, and may interfere with the ability of the user to sense the presence other people near them and/or to be aware of another person's attempts to draw the attention of the user 110.

In the hailing scenario 100, a person 130 approaches the user 110 and attempts to hail the user 110 using verbal and/or visual cues. For example, there may be visual cues apparent on the face 132 and/or the eyes 134 of the person 130 that indicate the person 130 is trying to hail the user 110. For example, the person 130 may turn their face 132 toward the user 110 when they are attempting to hail the user 110. For example, the person 130 may gaze in the direction of the user 110 using their eyes 134 when they are attempting to hail the user 110. In the hailing scenario 100, the person 130 also provides an audio trigger 140, such as speaking to the user 110 (e.g., speaking a special hailing phrase, such as "excuse me" or a name of the user 110).

In the hailing scenario 100, the visual and/or audio triggers 140 may be detected (e.g., using one or more sensors mounted on the head-mounted display 120) and analyzed to detect when the person 130 is attempting to hail the user 110. For example, an audio direction of arrival 150 (e.g., determined based on processing signals recorded with an array of microphones) for the audio trigger 140 may be compared to a view angle 160 at which the person 130 appears in images (e.g., images captured using image sensors mounted on the head-mounted display 120). For example, a face orientation 170 may be estimated for the face 132 of the person 130 to assess whether the person 130 is looking at the user 110. In some implementations, the face orientation 170 may be determined relative to the head-mounted display or another device worn by the user 110. For example, the estimate of the orientation of the face may be stored as an angle with respect to the view angle 160 from the head-mounted display 120 display to the person 130. Data from multiple sensing modes (e.g., images and audio signals) may be combined or fused (e.g., using weighted average and/or a machine learning module) to determine when a hailing event is occurring.

When the available data indicates that a hailing event has occurred, the user 110 may be alerted regarding the attempt by the person 130 to hail the user 110. For example, an alert may include audio and/or video that is presented to the user 110 using the head-mounted display. For example, the process 1000 of FIG. 10 may be implemented to invoke an alert.

Figure 2:
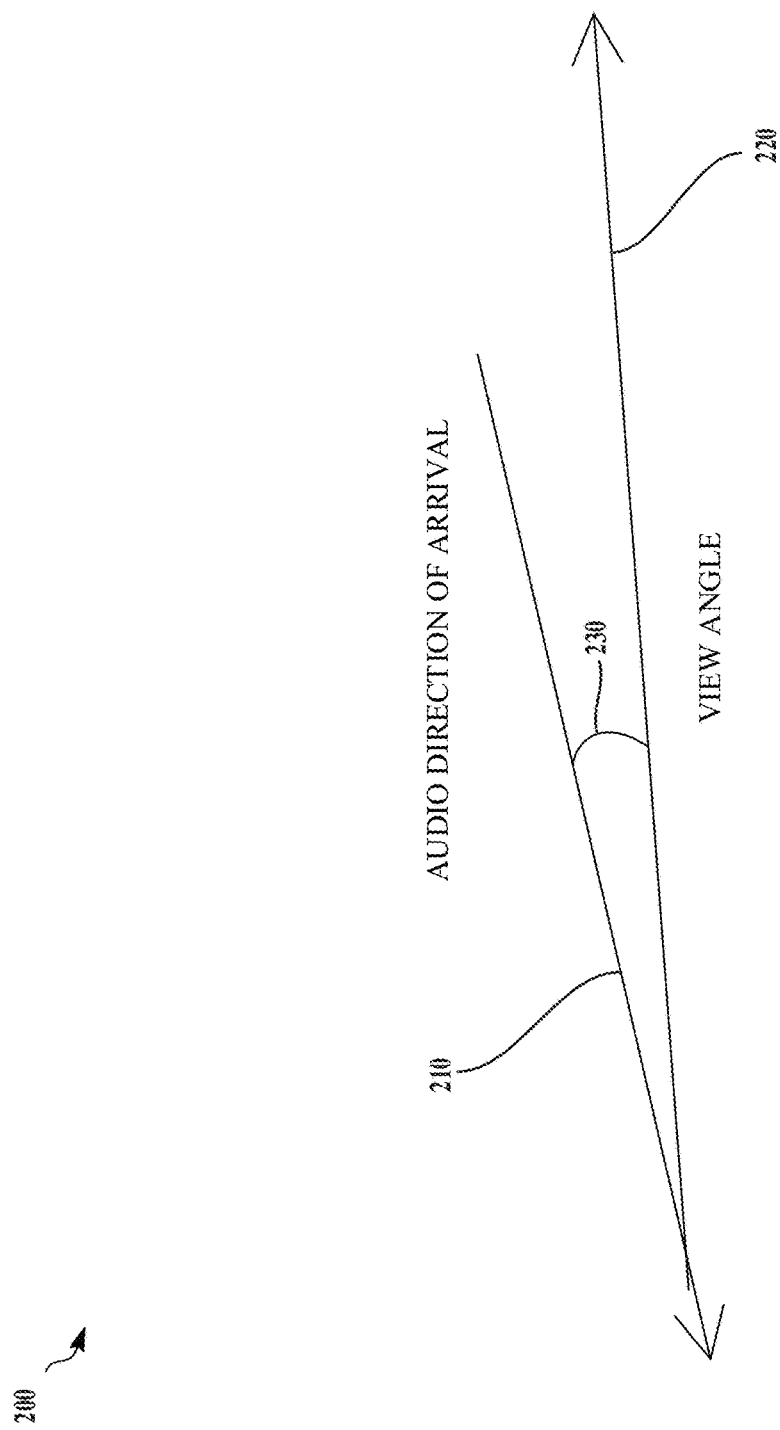
FIG. 2 is an illustration of an example of a comparison of an audio direction of arrival and a view angle.

FIG. 2 is an illustration of an example of a comparison 200 of an audio direction of arrival 210 and a view angle 220. For example, the audio direction of arrival 210 may be determined as a vector in a coordinate system of a head-mounted display or another device worn by or positioned near a user wearing the head-mounted display. For example, the audio direction of arrival 210 may be determined based on analysis (e.g., beamforming analysis) of one or more audio signals from one or more microphones (e.g., the one or more microphones 350) to identify a direction of arrival for a speech signal reflected in the one or more audio signals. For example, the view angle 220 may be determined as a vector in the coordinate system of the head-mounted display or another device worn by or positioned near the user wearing the head-mounted display. For example, the view angle 220 may be determined based on analysis (e.g., computer vision and/or face detection processing) of one more images captured using one or more image sensors (e.g., the one or more image sensors 330) to identify a view angle for a person (e.g., the person 130) appearing in the one or more images.

An angle 230 may be determined between the audio direction of arrival 210 and the view angle 220. For example, the angle 230 may be compared to a threshold (e.g., 5 degrees, 10 degrees, 15 degrees, or 30 degrees) to determine whether the audio direction of arrival 210 and the view angle 220 are aligned to degree that is consistent with the speech signal originating from the person appearing at the view angle 220.

Figure 3:
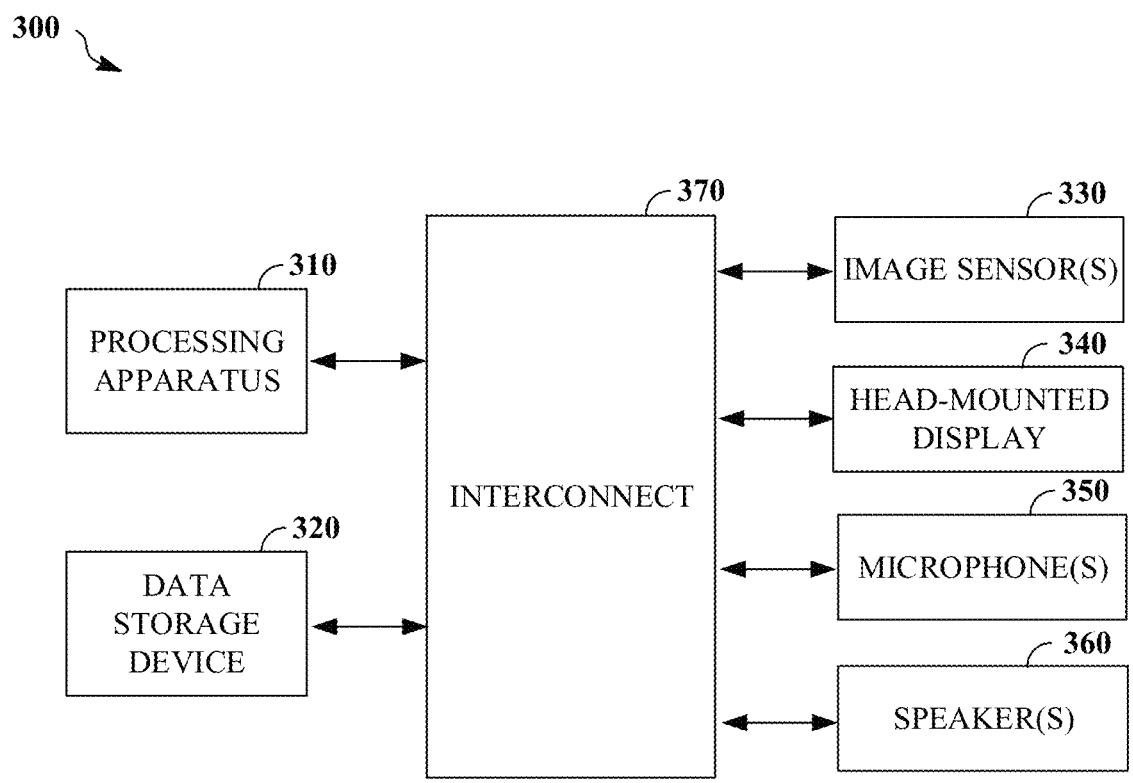
FIG. 3 is a block diagram of an example of a system configured to enable hailing of a user wearing a head-mounted display.

FIG. 3 is a block diagram of an example of a system 300 configured to enable hailing of a user wearing a head-mounted display (e.g., the head-mounted display 120). The system 300 includes a processing apparatus 310, a data storage device 320, one or more image sensors 330, a head-mounted display 340, one or more microphones 350, one or more speakers 360, and an interconnect 370 through which the processing apparatus 310 may access the other components. The system 300 may be configured to detect hailing events and/or to present alerts to a user wearing the head-mounted display regarding the hailing events. For example, the system 300 may be configured to implement the process 500 of FIG. 5. For example, the system 300 may be configured to implement the process 600 of FIG. 6. For example, the system 300 may be configured to implement the process 700 of FIG. 7. For example, the system 300 may be configured to implement the process 800 of FIG. 8. For example, the system 300 may be configured to implement the process 900 of FIG. 9. For example, the system 300 may be configured to implement the process 1000 of FIG. 10. For example, the system 300 may be implemented as part of a head-mounted display device (e.g., the head-mounted display 120).

The processing apparatus 310 may be operable to execute instructions that have been stored in a data storage device 320. In some implementations, the processing apparatus 310 is a processor with random access memory for temporarily storing instructions read from the data storage device 320 while the instructions are being executed. The processing apparatus 310 may include single or multiple processors each having single or multiple processing cores. Alternatively, the processing apparatus 310 may include another type of device, or multiple devices, capable of manipulating or processing data. For example, the data storage device 320 may be a non-volatile information storage device such as a hard drive, a solid-state drive, a read-only memory device (ROM), an optical disc, a magnetic disc, or any other suitable type of storage device such as a non-transitory computer readable memory. The data storage device 320 may include another type of device, or multiple devices, capable of storing data for retrieval or processing by the processing apparatus 310. The processing apparatus 310 may access and manipulate data stored in the data storage device 320 via the interconnect 370. For example, the data storage device 320 may store instructions executable by the processing apparatus 310 that upon execution by the processing apparatus 310 cause the processing apparatus 310 to perform operations (e.g., operations that implement the process 500 of FIG. 5).

The one or more image sensors 330 may be configured to capture images, converting light incident on the one or more image sensors 330 into one or more digital images. The one or more image sensors 330 may detect light of a certain spectrum (e.g., a visible spectrum and/or an infrared spectrum) and convey information constituting an image as electrical signals (e.g., analog or digital signals). For example, the one or more image sensors 330 may include charge-coupled devices (CCD) or active pixel sensors in complementary metal-oxide-semiconductor (CMOS). In some implementations, the one or more image sensors 330 include an analog-to-digital converter. For example, the one or more image sensors 330 may include an infrared camera and a visible light camera. The one or more image sensors 330 may include an image sensor configured to capture images of a vicinity of the head-mounted display. In some implementations, the one or more image sensors 330 include an array of image sensors arranged around a device (e.g., the head-mounted display 120) to provide a collective field of view spanning a wide angle. For example, the one or more image sensors 330 may be arranged to provide a panoramic view (e.g., a 360 degree panoramic view) of an area around a head-mounted display. For example, the one or more image sensors 330 may receive light through respective lenses (e.g., a fisheye lens or a rectilinear lens).

The head-mounted display 340 includes a screen, a lens, or another type of optical assembly configured to direct light to the eyes of a user wearing the head-mounted display 340 to enable the presentation of images (e.g., video frames) to the user. The head-mounted display may be held in place on a face of the user by a fastening article (e.g., a headband or a frame). In some implementations, a screen of the head-mounted display 340 is positioned directly in front of eyes of the user. The screen may be opaque and may obscure the user's view of a surrounding environment. Such a configuration may be used, for example, to provide immersive virtual reality experiences. In some implementations, the head-mounted display 340 include an optical assembly (e.g., a lens and/or a mirror) that is positioned directly in front of eyes of the user and configured to direct light from a screen or projector of the head-mounted display 340 to the eyes of the user. The optical assembly may also direct light from an environment around the user to eyes of the user. For example, the optical assembly may include a partially reflective polarizing film applied to an inner surface of a transparent visor. The optical assembly may function as an optical combiner. For example, a lens of the optical assembly may also let light from an environment in front of the user pass through to reach eyes of the user and allow the user to see in front of him while having objects depicted in an image presented by the head-mounted display 340 overlaid on a view of the physical environment in front of the user. In some implementations, a transparency of the optical assembly (e.g., a lens) may be adjusted to suit an application (e.g., a virtual reality application or an augmented reality application).

The one or more microphones 350 may be configured to capture audio signals, converting sound waves incident on the one or more microphones 350 into one or more digital audio recordings. The one or more microphones 350 may detect sound and convey information constituting an audio signal as electrical signals (e.g., analog or digital signals). In some implementations, the one or more microphones 350 include an analog-to-digital converter. The one or more microphones 350 may include a microphone configured to capture sound in a vicinity of the head-mounted display. In some implementations, the one or more microphones 350 include an array of microphones arranged around a device (e.g., the head-mounted display 120) to enable beamforming processing of sound incident on the one or more microphones 350.

The one or more speakers 360 may be configured to present audio signals to the user wearing the head-mounted display. For example, the one or more speakers 360 may include headphones that may be worn in or on ears of the user.

For example, the interconnect 370 may be a system bus, or a wired or wireless network (e.g., a body area network).

The processing apparatus 310 may be configured to enable or facilitate hailing of a user wearing a head-mounted display by another person. For example, the processing apparatus 310 may be configured to access an image captured using the one or more image sensors 330, and detect, based at least in part on the image, a person within a distance of the head-mounted display 340. The processing apparatus 310 may be configured to determine a view angle to the person with respect to the head-mounted display 340. For example, the processing apparatus 310 may be configured to access an audio signal captured using the one or more microphones 350 and detect, based at least in part on the audio signal, a speech signal. The processing apparatus 310 may be configured to determine a direction of arrival of the speech signal with respect to the head-mounted display 340. The processing apparatus 310 may be configured to compare the direction of arrival and the view angle, and detect a hail event based on the comparison of the direction of arrival and the view angle. The processing apparatus 310 may be configured to, responsive to the hail event, invoke an alert using the head-mounted display 340. For example, the processing apparatus 310 may be configured to recognize, based at least in part on the image, a face of the person as associated with a known person of interest (e.g., a person with a face that has been registered with the system 300); and detect the hail event based on the recognition of the face. For example, the processing apparatus 310 may be configured to detect, based at least in part on the image, a face of the person; determine an estimate of an orientation of the face with respect to the head-mounted display 340; and detect the hail event based on the estimate of the orientation of the face. For example, determining an estimate of an orientation of the face may include determining a measure of symmetry of a projection of the face appearing in the image; and determining the estimate of the orientation of the face based on the measure of symmetry. For example, the processing apparatus 310 may be configured to detect, based at least in part on the image, a face of the person; determine a gaze direction of the person with respect to the head-mounted display 340; and detect the hail event based on the gaze direction. For example, the processing apparatus 310 may be configured to recognize an audio trigger in the speech signal; and detect the hail event based on recognition of the audio trigger. For example, the processing apparatus 310 may be configured to input a feature based on the comparison of the direction of arrival and the view angle to a machine learning module (e.g., a neural network of a support vector machine); and detect the hail event based on an output of the machine learning module. For example, the processing apparatus 310 may be configured to determine an angle between the direction of arrival and the view angle; determine a weighted average of the angle and metrics determined for other factors of a plurality of factors (e.g., including factors related to recognition of a face, a face orientation, a gaze direction, and/or an audio trigger); and detect the hail event based on the weighted average by comparing the weighted average to a threshold.

Figure 4:
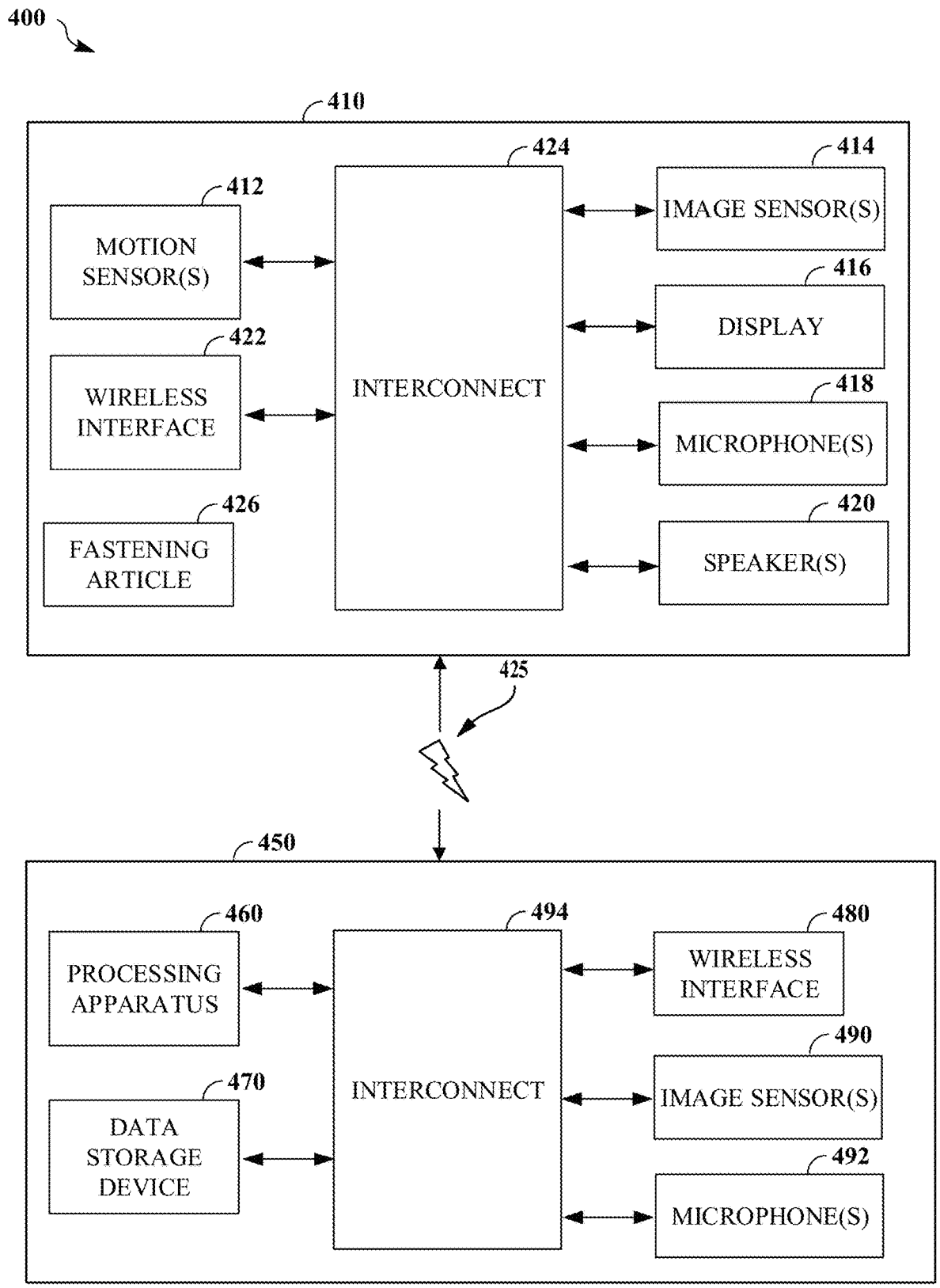
FIG. 4 is a block diagram of an example of a system configured to enable hailing of a user wearing a head-mounted display.

FIG. 4 is a block diagram of an example of a system 400 configured to enable hailing of a user wearing a head-mounted display. The system 400 includes a head-mounted display 410 and a computing device 450 that communicate via wireless communications link 425. The head-mounted display 410 includes one or more motions sensors 412, one or more image sensors 414, a display 416, one or more microphones 418, one or more speakers 420, a wireless communications interface 422, an interconnect 424 through which components of the head-mounted display may exchange information (e.g., under the control of microcontroller or other processing apparatus in the head-mounted display 410 that is not shown in FIG. 4), and a fastening article 426 configured to hold the head-mounted display 410 in place on a head of a user that is wearing the head-mounted display 410. The computing device 450 includes a processing apparatus 460, a data storage device 470, a wireless communications interface 480, one or more image sensors 490, one or more microphones 492, and an interconnect 494 through which the processing apparatus 460 may access the other components of the computing device 450. The computing device 450 may be positioned near a user wearing the head-mounted display 410 and may use its sensors to detect people and/or hailing events in a vicinity of the head-mounted display 410. For example, the computing device 450 may be an appliance (e.g., a smart television or a smart speaker) on a table located in a room with the user, or the computing device 450 may be another wearable device worn at a different body part of the user. The system 400 may be configured to detect hailing events and/or to present alerts to a user wearing the head-mounted display 410 regarding the hailing events. For example, the computing device 450 may be configured to invoke the presentations of an alert to the user using the head-mounted display 410 when the computing device 450 detects a hailing event. For example, the system 300 may be configured to implement the process 500 of FIG. 5. For example, the system 400 may be configured to implement the process 600 of FIG. 6. For example, the system 400 may be configured to implement the process 700 of FIG. 7. For example, the system 400 may be configured to implement the process 800 of FIG. 8. For example, the system 400 may be configured to implement the process 900 of FIG. 9. For example, the system 400 may be configured to implement the process 1000 of FIG. 10.

The head-mounted display 410 includes one or more motion sensors 412. The one or more motion sensors 412 may be configured to detect motion of the head-mounted display 410 and/or to track motion of a user wearing of the head-mounted display 410. For example, the one or more motion sensors 412 may include accelerometers, gyroscopes, magnetometers, and/or a global positioning system receiver. The one or more motion sensors 412 may be used to track a position and/or an orientation of head-mounted display 410. For example, the one or more motion sensors 412 may be used to detect gestures or other movements by a user wearing the head-mounted display 410, and may serve as a control interface for the head-mounted display 410. For example, position and/or orientation data based measurements from the motion sensors 412 may be transmitted to the computing device 450 to enable the computing device to track the position and/or orientation of the head-mounted display 410 relative to its own sensors.

The head-mounted display 410 includes one or more image sensors 414. The one or more image sensors 414 may be configured to capture images, converting light incident on the one or more image sensors 414 into one or more digital images. The one or more image sensors 414 may detect light of a certain spectrum (e.g., a visible spectrum and/or an infrared spectrum) and convey information constituting an image as electrical signals (e.g., analog or digital signals). For example, the one or more image sensors 414 may include charge-coupled devices (CCD) or active pixel sensors in complementary metal-oxide-semiconductor (CMOS). In some implementations, the one or more image sensors 414 include an analog-to-digital converter. For example, the one or more image sensors 414 may include an infrared camera and a visible light camera. The one or more image sensors 414 may include an image sensor configured to capture images of a vicinity of the head-mounted display 410. In some implementations, the one or more image sensors 414 include an array of image sensors arranged around the head-mounted display 410 to provide a collective field of view spanning a wide angle. For example, the one or more image sensors 414 may be arranged to provide a panoramic view (e.g., a 360 degree panoramic view) of an area around a head-mounted display 410.

The head-mounted display 410 includes a display 416. The display 416 may be configured to present images, converting digital images into light projected from the display 416. The display 416 may project light using an array of pixels that project light in a visible spectrum. The display 416 may include a screen, a lens, or another type of optical assembly configured to direct light to the eyes of a user wearing the head-mounted display 410 to enable the presentation of images (e.g., video frames) to the user. For example, the display 416 may include a screen, such as a liquid crystal display (LCD), a light emitting diode (LED) display (e.g., an OLED display), or other suitable screen. For example, the display 416 may include a projector. In some implementations, a screen of the display 416 is positioned directly in front of eyes of the user. The screen may be opaque and may obscure the user's view of a surrounding environment. Such a configuration may be used, for example, to provide immersive virtual reality experiences. In some implementations, the display 416 includes an optical assembly (e.g., a lens and/or a mirror) that is positioned directly in front of eyes of the user and configured to direct light from a screen or projector of the display 416 to the eyes of the user. The optical assembly may also direct light from an environment around the user to eyes of the user. For example, the optical assembly may include a partially reflective polarizing film applied to an inner surface of a transparent visor. The optical assembly may function as an optical combiner. For example, a lens of the optical assembly may also let light from an environment in front of the user pass through to reach eyes of the user and allow the user to see in front of him while having objects depicted in an image presented by the display 416 overlaid on a view of the physical environment in front of the user. In some implementations, a transparency of the optical assembly (e.g., a lens) may be adjusted to suit an application (e.g., a virtual reality application or an augmented reality application).

The head-mounted display 410 includes one or more microphones 418. The one or more microphones 418 may be configured to capture audio signals, converting sound waves incident on the one or more microphones 418 into one or more digital audio recordings. The one or more microphones 418 may detect sound and convey information constituting an audio signal as electrical signals (e.g., analog or digital signals). In some implementations, the one or more microphones 418 include an analog-to-digital converter. The one or more microphones 418 may include a microphone configured to capture sound in a vicinity of the head-mounted display 410. In some implementations, the one or more microphones 418 include an array of microphones arranged around the head-mounted display 410 to enable beamforming processing of sound incident on the one or more microphones 418.

The head-mounted display 410 includes one or more speakers 420. The one or more speakers 420 may be configured to present audio signals to the user wearing the head-mounted display 410. For example, the one or more speakers 420 may include headphones that may be worn in or on ears of the user.

The head-mounted display 410 includes a wireless communications interface 422. The wireless communications interface 422 facilitates communication with other devices, including the computing device 450. For example, wireless communications interface 422 may facilitate communication via a Wi-Fi network, a Bluetooth link, or a ZigBee link. In some implementations, the wireless communications interface 422 may be used to receive data and/or instructions invoking an alert from the computing device 450.

For example, the interconnect 424 may be a system bus, or a wired or wireless network (e.g., a body area network).

The head-mounted display 410 includes a fastening article 426. The fastening article 426 may be configured to hold the head-mounted display 410 in place on a head of a user when the user is wearing the head-mounted display 410. For example, the fastening article 426 may include a headband. For example, the fastening article 426 may include a frame with arms that rest on ears of the user and hold a lens or a screen of the display 416 in front of an eye of the user.

The computing device 450 includes a processing apparatus 460. The processing apparatus 460 may be operable to execute instructions that have been stored in a data storage device 470. In some implementations, the processing apparatus 460 is a processor with random access memory for temporarily storing instructions read from the data storage device 470 while the instructions are being executed. The processing apparatus 460 may include single or multiple processors each having single or multiple processing cores. Alternatively, the processing apparatus 460 may include another type of device, or multiple devices, capable of manipulating or processing data. For example, the data storage device 470 may be a non-volatile information storage device such as a hard drive, a solid-state drive, a read-only memory device (ROM), an optical disc, a magnetic disc, or any other suitable type of storage device such as a non-transitory computer readable memory. The data storage device 470 may include another type of device, or multiple devices, capable of storing data for retrieval or processing by the processing apparatus 460. The processing apparatus 460 may access and manipulate data stored in the data storage device 470 via interconnect 494. For example, the data storage device 470 may store instructions executable by the processing apparatus 460 that upon execution by the processing apparatus 460 cause the processing apparatus 460 to perform operations (e.g., operations that implement the process 500 of FIG. 5).

The computing device 450 includes a wireless communications interface 480. The wireless communications interface 480 facilitates communication with other devices, including the head-mounted display 410. For example, wireless communications interface 480 may facilitate communication via a Wi-Fi network, a Bluetooth link, or a ZigBee link. The wireless communications interface 480 may be used to establish the wireless communications link 425 with the head-mounted display 410. In some implementations, the wireless communications interface 480 may be used to receive sensor data (e.g., motion sensor data, images, or audio signals) from the head-mounted display 410. In some implementations, the wireless communications interface 480 may be used to transmit data and/or instructions invoking an alert to the head-mounted display 410.

The computing device 450 includes one or more image sensors 490. The one or more image sensors 490 may be configured to capture images, converting light incident on the one or more image sensors 490 into one or more digital images. The one or more image sensors 490 may detect light of a certain spectrum (e.g., a visible spectrum and/or an infrared spectrum) and convey information constituting an image as electrical signals (e.g., analog or digital signals). For example, the one or more image sensors 490 may include charge-coupled devices (CCD) or active pixel sensors in complementary metal-oxide-semiconductor (CMOS). In some implementations, the one or more image sensors 490 include an analog-to-digital converter. For example, the one or more image sensors 490 may include an infrared camera and a visible light camera. The one or more image sensors 490 may include an image sensor configured to capture images of a vicinity of the head-mounted display 410. In some implementations, the one or more image sensors 490 include an array of image sensors arranged around a room that a user of the head-mounted display 410 is located in. For example, the one or more image sensors 490 may be arranged to provide a panoramic view (e.g., a 360 degree panoramic view) of an area around a head-mounted display 410. For example, the one or more image sensors 490 may receive light through respective lenses (e.g., a fisheye lens or a rectilinear lens).

The computing device 450 includes one or more microphones 492. The one or more microphones 492 may be configured to capture audio signals, converting sound waves incident on the one or more microphones 492 into one or more digital audio recordings. The one or more microphones 492 may detect sound and convey information constituting an audio signal as electrical signals (e.g., analog or digital signals). In some implementations, the one or more microphones 492 include an analog-to-digital converter. The one or more microphones 492 may include a microphone configured to capture sound in a vicinity of the head-mounted display 410. In some implementations, the one or more microphones 492 include an array of microphones to enable beamforming processing of sound incident on the one or more microphones 492. In some implementations, the one or more microphones 492 include an array of microphones arranged around a room in which a user wearing the head-mounted display 410 is located in.

For example, the interconnect 494 may be a system bus, or a wired or wireless network (e.g., a body area network).

The processing apparatus 460 may be configured to enable or facilitate hailing of a user wearing the head-mounted display 410 by another person. For example, the processing apparatus 460 may be configured to access an image captured using the one or more image sensors 490 and/or the one or more image sensors 414, and detect, based at least in part on the image, a person within a distance of the head-mounted display 410. The processing apparatus 460 may be configured to determine a view angle to the person with respect to the head-mounted display 410. For example, the processing apparatus 460 may be configured to access an audio signal captured using the one or more microphones 492 and/or the one or more microphones 418 and detect, based at least in part on the audio signal, a speech signal. The processing apparatus 460 may be configured to determine a direction of arrival of the speech signal with respect to the head-mounted display 410. The processing apparatus 460 may be configured to compare the direction of arrival and the view angle, and detect a hail event based on the comparison of the direction of arrival and the view angle. The processing apparatus 460 may be configured to, responsive to the hail event, invoke an alert using the head-mounted display 410. For example, the processing apparatus 460 may be configured to recognize, based at least in part on the image, a face of the person as associated with a known person of interest (e.g., a person with a face that has been registered with the system 400); and detect the hail event based on the recognition of the face. For example, the processing apparatus 460 may be configured to detect, based at least in part on the image, a face of the person; determine an estimate of an orientation of the face with respect to the head-mounted display 410; and detect the hail event based on the estimate of the orientation of the face. For example, determining an estimate of an orientation of the face may include determining a measure of symmetry of a projection of the face appearing in the image; and determining the estimate of the orientation of the face based on the measure of symmetry. For example, the processing apparatus 460 may be configured to detect, based at least in part on the image, a face of the person; determine a gaze direction of the person with respect to the head-mounted display 410; and detect the hail event based on the gaze direction. For example, the processing apparatus 460 may be configured to recognize an audio trigger in the speech signal; and detect the hail event based on recognition of the audio trigger. For example, the processing apparatus 460 may be configured to input a feature based on the comparison of the direction of arrival and the view angle to a machine learning module (e.g., a neural network of a support vector machine); and detect the hail event based on an output of the machine learning module. For example, the processing apparatus 460 may be configured to determine an angle between the direction of arrival and the view angle; determine a weighted average of the angle and metrics determined for other factors of a plurality of factors (e.g., including factors related to recognition of a face, a face orientation, a gaze direction, and/or an audio trigger); and detect the hail event based on the weighted average by comparing the weighted average to a threshold.

Figure 5:
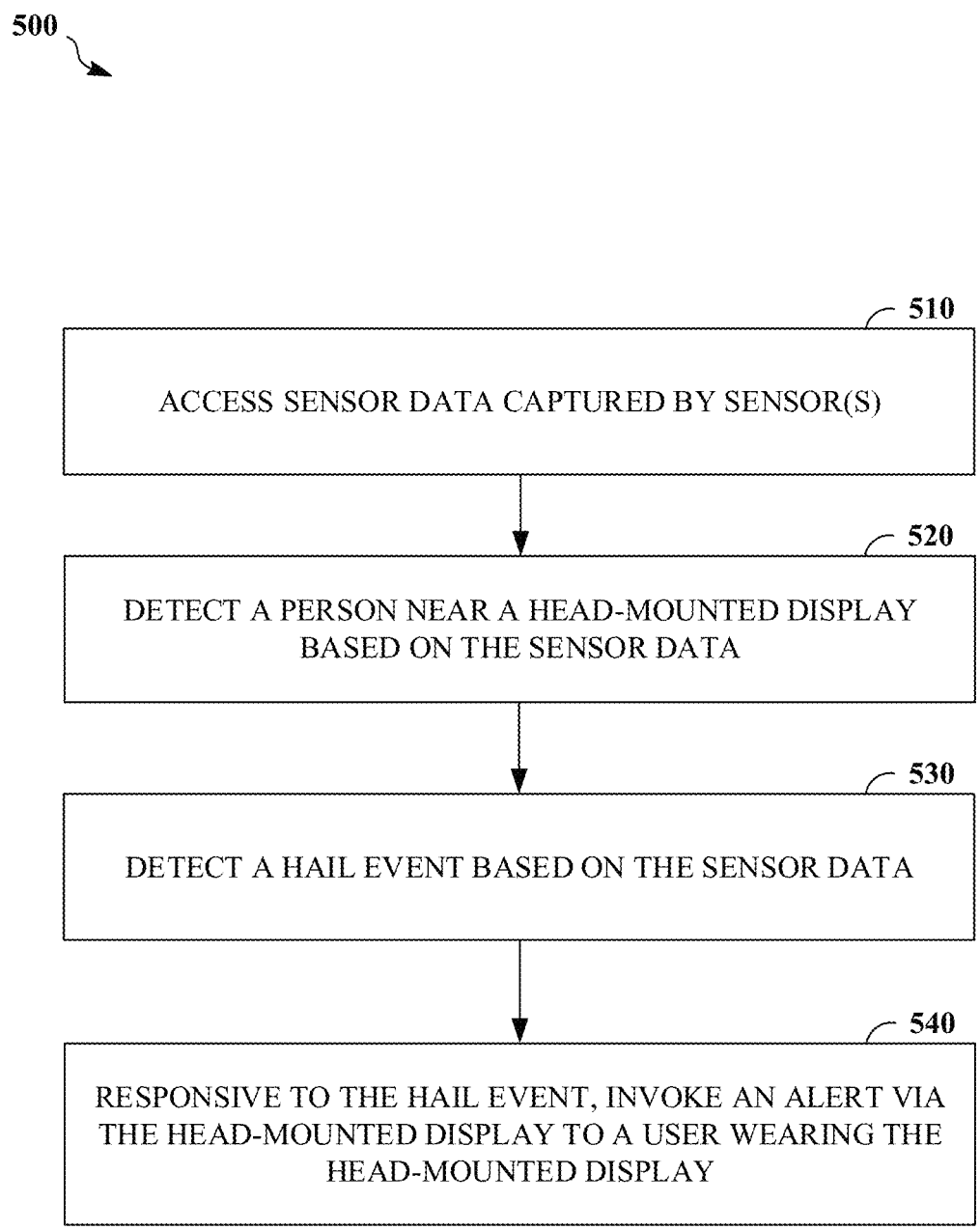
FIG. 5 is a flowchart of an example of a process for facilitating hailing of a user wearing a head-mounted display.
Figure 6:
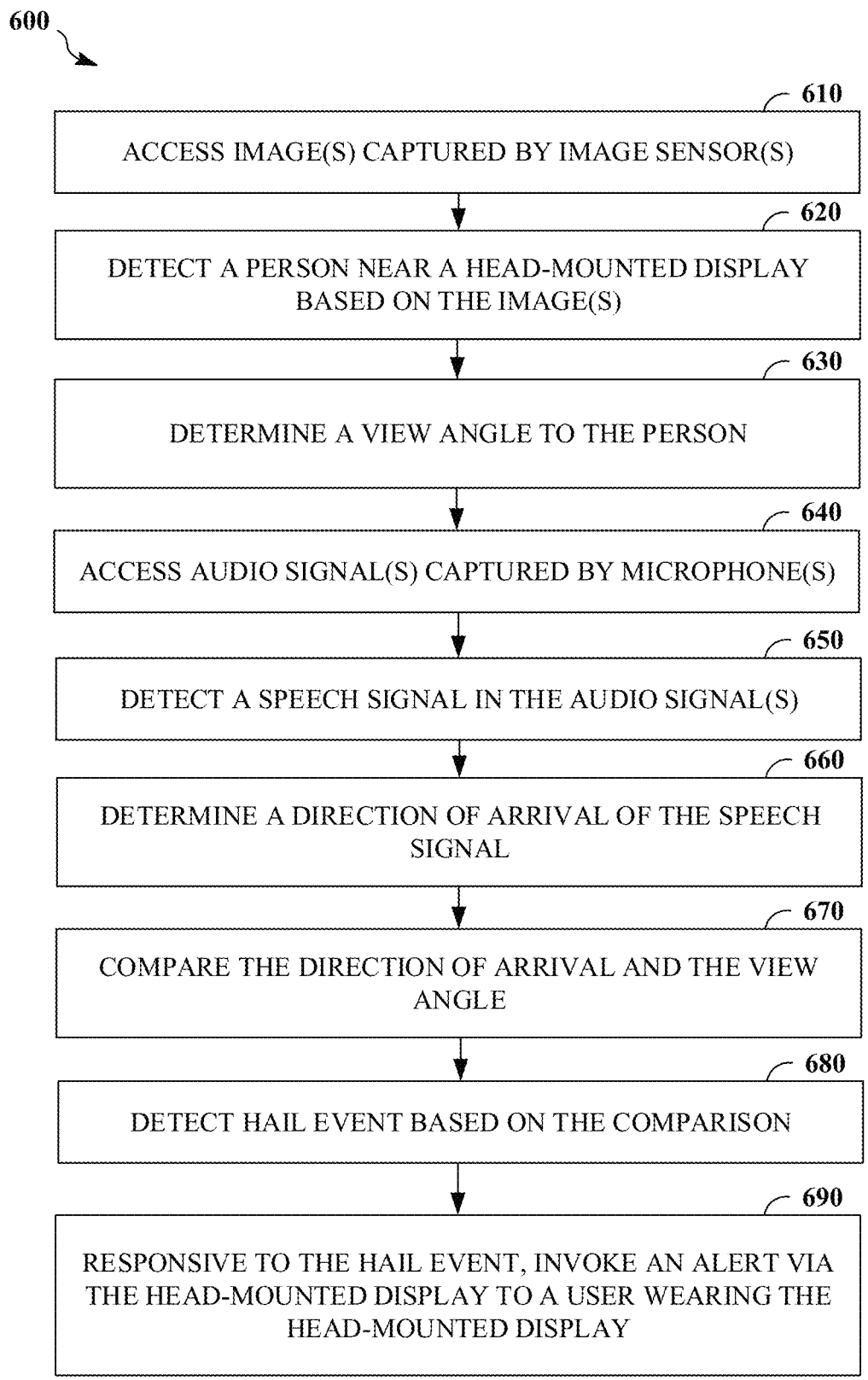
FIG. 6 is a flowchart of an example of a process for facilitating hailing of a user wearing a head-mounted display by detecting a hail event based on image data and audio data.
Figure 7:
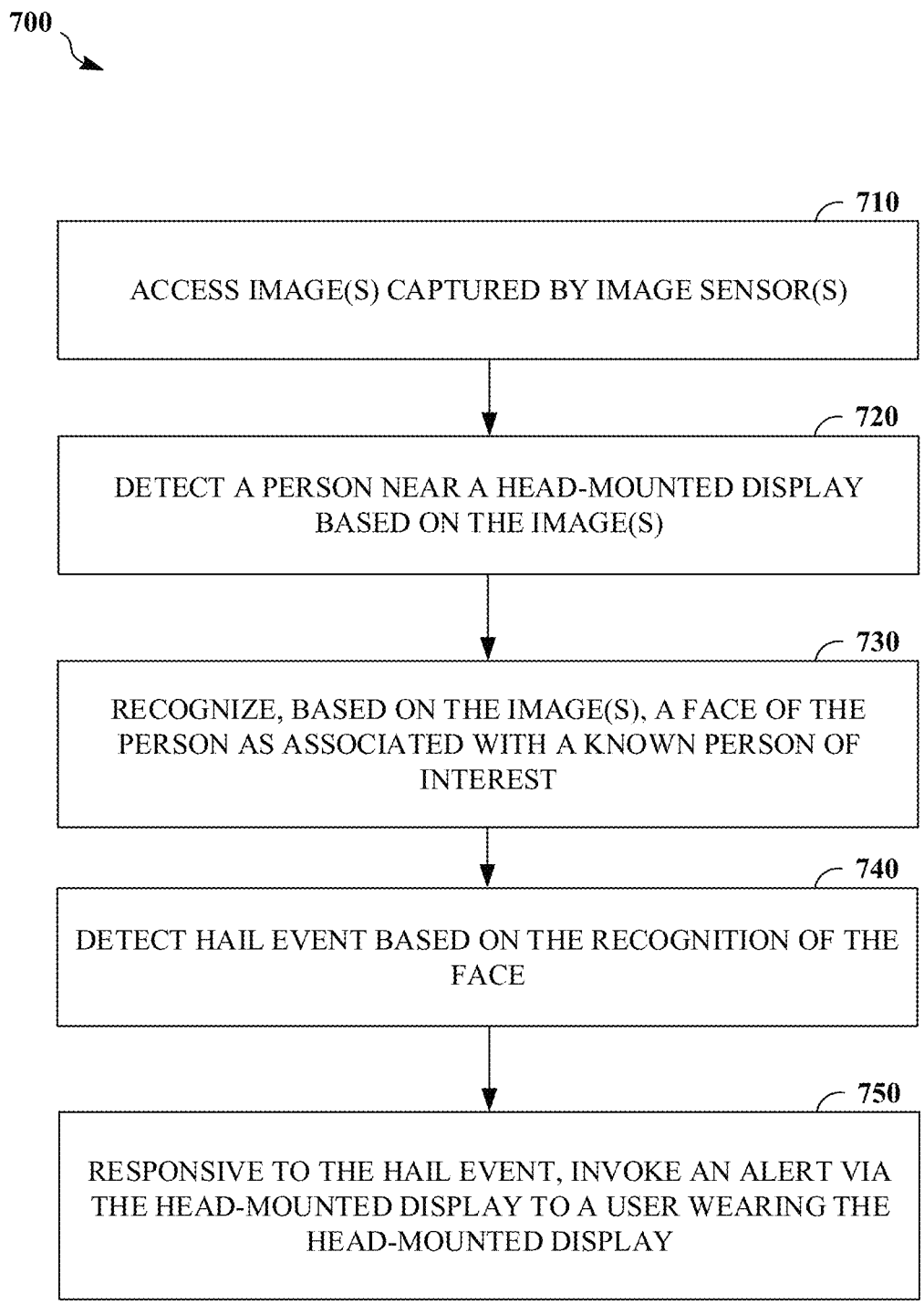
FIG. 7 is a flowchart of an example of a process for facilitating hailing of a user wearing a head-mounted display by detecting a hail event based recognition of a known face.
Figure 8:
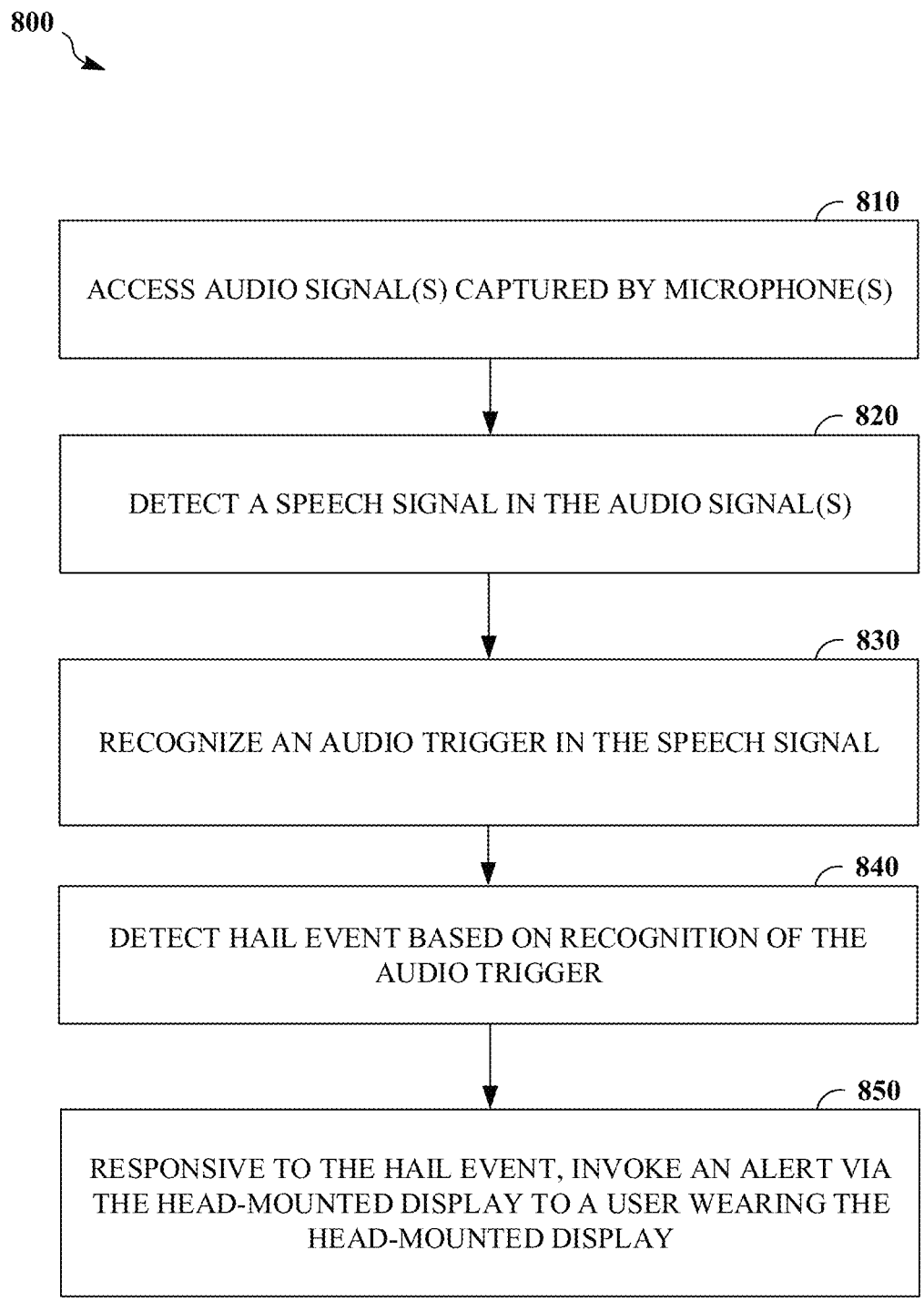
FIG. 8 is a flowchart of an example of a process for facilitating hailing of a user wearing a head-mounted display by detecting a hail event based on recognition of an audio trigger.
Figure 9:
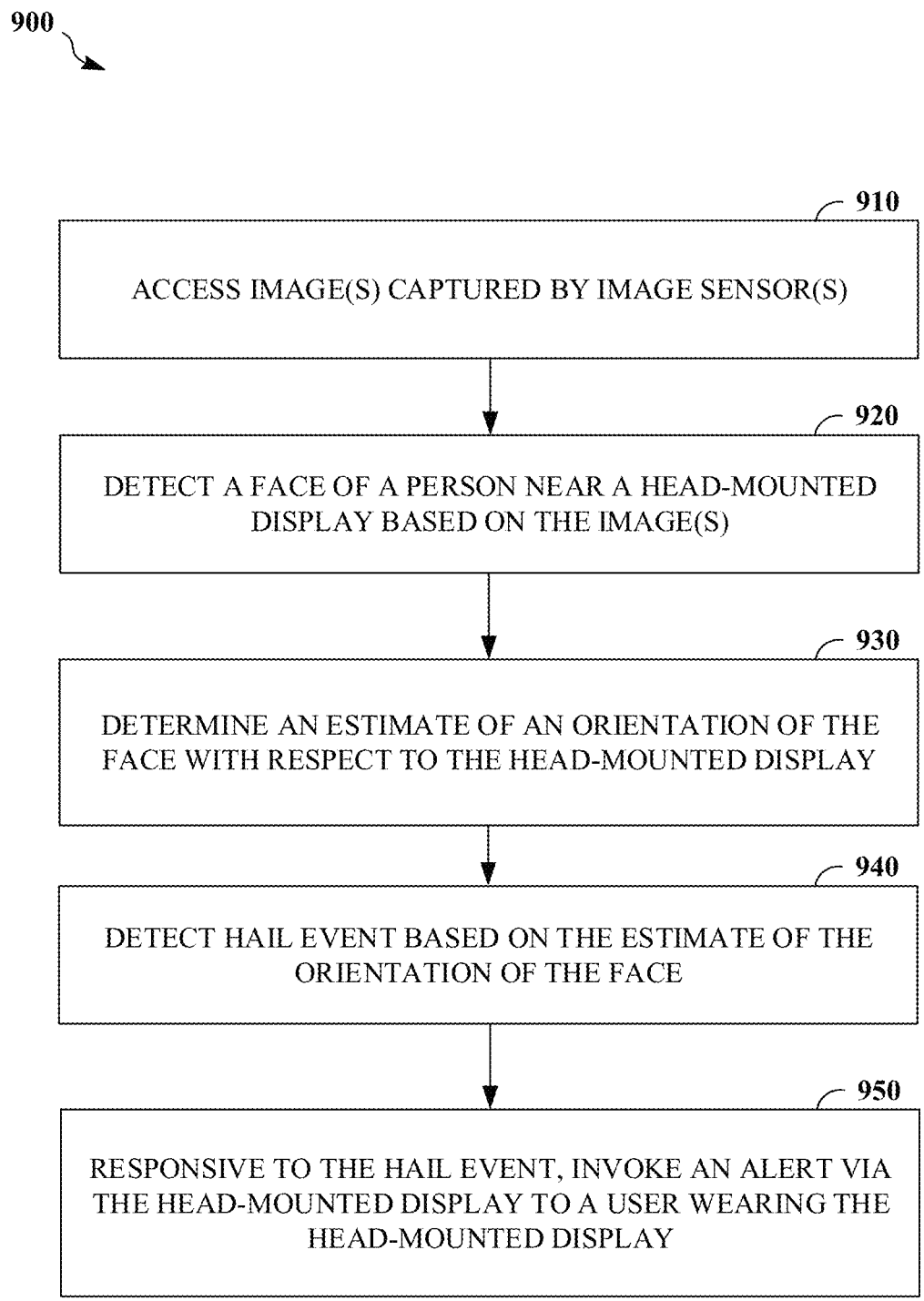
FIG. 9 is a flowchart of an example of a process for facilitating hailing of a user wearing a head-mounted display by detecting a hail event based on face orientation of another person.
Figure 10:
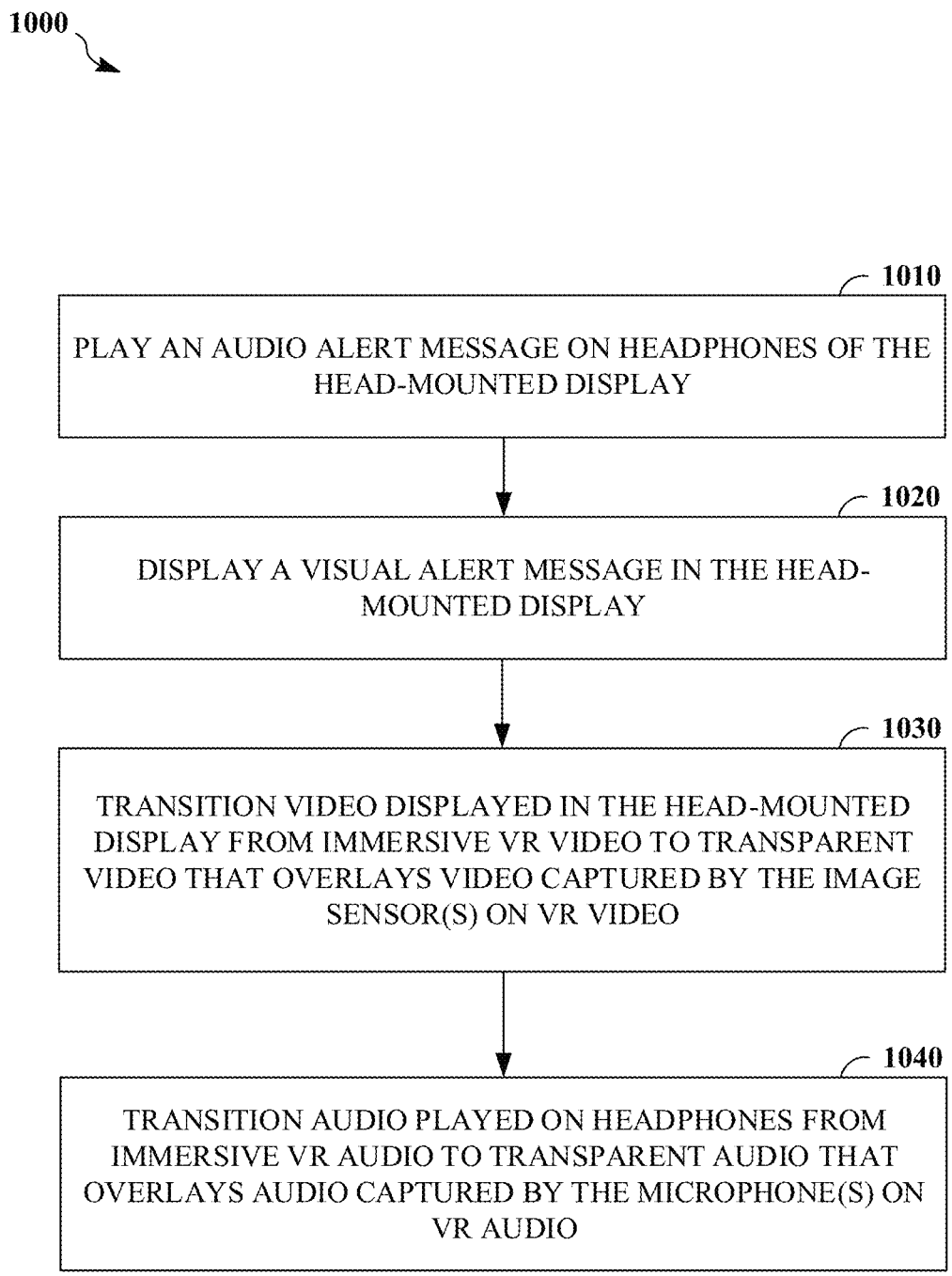
FIG. 10 is a flowchart of an example of a process for alerting a user of a head-mounted display of a hail event.

In some implementations (not shown in FIG. 4), the head-mounted display 410 includes a processing apparatus that receives sensor data (e.g., images or audio signals) from the computing device 450 via the wireless communications link 425 and uses the sensor data to detect hail events and implement processes described herein (e.g., the process 500 of FIG. 5, the process 600 of FIG. 6, the process 700 of FIG. 7, the process 800 of FIG. 8, the process 900 of FIG. 9, or the process 1000 of FIG. 10).

FIG. 5 is a flowchart of an example of a process 500 for facilitating hailing of a user wearing a head-mounted display. The process 500 includes accessing 510 sensor data captured using one or more sensors; detecting 520 a person within a distance of a head-mounted display based on the sensor data; detecting 530 a hail event based on the sensor data; and responsive to the hail event, invoking 540 an alert using the head-mounted display. For example, the process 500 may be implemented by the system 300 of FIG. 3. For example, the process 500 may be implemented by the system 400 of FIG. 4.

The process 500 includes accessing 510 sensor data captured using one or more sensors. For example, the one or more sensors may include one or more image sensors (e.g., the one or more image sensors 330, the one or more image sensors 414, or the one or more image sensors 490). For example, the one or more image sensors may be positioned to provide a field of view covering an area around a user wearing a head mounted display. For example, the one or more sensors may include one or more microphones (e.g., the one or more microphones 350, the one or more microphones 418, or the one or more microphones 492). In some implementations, the one or more sensors are attached to a head-mounted display. In some implementations, the one or more sensors are positioned in a vicinity of a user wearing a head-mounted display. The sensor data may be accessed 510 in variety of ways. For example, the sensor data may be accessed 510 by reading directly from a sensor or from a memory via an interconnect (e.g., the interconnect 370). For example, the sensor data may be accessed 510 by receiving sensor data via a communications link (e.g., the wireless communications link 425).

The process 500 includes detecting 520, based at least in part on the sensor data, a person within a distance of a head-mounted display. For example, computer vision processing (e.g., using a convolutional neural network) may be applied to an image of the sensor data to detect 520 a person appearing in the image. For example, speech recognition processing may be applied to an audio signal of the sensor data to detect 520 the person by detecting their speech in the audio signal.

The process 500 includes detecting 530 a hail event based on the sensor data. For example, the hail event may be detected 530 based on comparison of a direction of arrival of a speech signal and a view angle to a person appearing in an image (e.g., as described in relation to the process 600 of FIG. 6). For example, the hail event may be detected 530 based on recognition of a face of a person appearing in an image (e.g., as described in relation to the process 700 of FIG. 7). For example, the hail event may be detected 530 based on recognition of an audio trigger in a speech signal (e.g., as described in relation to the process 800 of FIG. 8). For example, the hail event may be detected 530 based on an estimate of orientation of a face of a person appearing in an image (e.g., as described in relation to the process 900 of FIG. 9). For example, the hail event may be detected 530 based on a gaze direction of the person with respect to the head-mounted display. In some implementations, the hail event may be detected 530 based on multiple factors. For example, a machine learning module (e.g., a neural network or a support vector machine) may be used to fuse multiple factors to detect 530 the hail event. For example, a weighted average of metrics (e.g., an angle between the direction of arrival and the view angle and/or a face orientation) determined for respective factors may be determined in order to fuse multiple factors to detect 530 the hail event.

The process 500 includes responsive to the hail event, invoking 540 an alert using the head-mounted display. In some implementations, the alert includes transitioning audio played on the headphones of the head-mounted display from immersive virtual reality audio to transparent audio that overlays audio captured using a microphone on virtual reality audio. In some implementations, the alert includes transitioning video displayed in the head-mounted display from immersive virtual reality video to transparent video that overlays video captured using the one or more sensors on virtual reality video. In some implementations, the alert includes playing an audio alert message on the headphones to announce the person. In some implementations, the alert includes displaying a visual alert message (e.g., a picture of the person detected 520) in the head-mounted display. For example, the process 1000 of FIG. 10 may be implemented to invoke 540 an alert using the head-mounted display. For example, invoking 690 the alert may include transmitting data and/or a command to the head-mounted display via a communications link (e.g. the wireless communications link 425) to cause the head-mounted display to present the alert.

FIG. 6 is a flowchart of an example of a process 600 for facilitating hailing of a user wearing a head-mounted display by detecting a hail event based on image data and audio data. The process 600 includes accessing 610 an image captured using an image sensor; detecting 620 a person within a distance of the head-mounted display based on the image; determining 630 a view angle to the person; accessing 640 an audio signal captured using a microphone; detecting 650 a speech signal in the audio signal; determining 660 a direction of arrival of the speech signal; comparing 670 the direction of arrival and the view angle; detecting 680 a hail event based on the comparison of the direction of arrival and the view angle; and responsive to the hail event, invoking 690 an alert using the head-mounted display. For example, the process 600 may be implemented by the system 300 of FIG. 3. For example, the process 600 may be implemented by the system 400 of FIG. 4.

The process 600 includes accessing 610 one or more images captured using one or more image sensors (e.g., the one or more image sensors 330 or the one or more image sensors 490). The one or more images may depict an area in the vicinity of a user wearing a head-mounted display (e.g., the head-mounted display 410). For example, an image may be accessed 610 by reading directly from an image sensor, by reading the image from memory or another storage device, or by receiving the image via a communications link (e.g., the wireless communications link 425) with another device.

The process 600 includes detecting 620, based at least in part on the one or more images, a person within a distance of the head-mounted display. For example, computer vision processing (e.g., using a convolutional neural network) may be applied to the one or more images to detect 620 a person appearing in the one or more images.

The process 600 includes determining 630 a view angle to the person (e.g., with respect to the head-mounted display). For example, where the one or more image sensors are attached to the head-mounted display, the view angle may be determined 630 based on pixel locations that are determined to depict the person in the one or more images. In some implementations, where the one or more image sensors are not attached to the head-mounted display, motion data for the head mounted display may be used to determine a relative position and/or orientation of head-mounted display to the one or more image sensors and to translate a view angle determined from pixel locations of the person in the one or more images to a view angle in a coordinate system of the head-mounted display.

The process 600 includes accessing 640 one or more audio signals captured using one or more microphones (e.g., the one or more microphones 350 or the one or more microphones 492). The one or more audio signals may be records of sound in a vicinity of the head-mounted display. For example, an audio signal may be accessed 610 by reading directly from a microphone, by reading the audio signal from memory or another storage device, or by receiving the audio signal via a communications link (e.g., the wireless communications link 425) with another device.

The process 600 includes detecting 650, based at least in part on the one or more audio signals, a speech signal. For example, speech recognition processing (e.g., implemented using a hidden Markov model and/or a neural network) may be applied to the one or more audio signals to identify a speech signal in the one or more audio signals. For example, a machine learning module (e.g., a neural network) may be trained to identify and isolate a speech signal within an audio signal.

The process 600 includes determining 660 a direction of arrival of the speech signal (e.g., with respect to the head-mounted display). In some implementations, the speech signal is detected in multiple audio signals captured using multiple microphones and correlations between copies of the speech signal may be analyzed to determine 660 a direction of arrival of the speech signal. For example, beamforming processing may be applied to copies of the speech signal detected in recordings from an array of microphones and used to determine 660 a direction of arrival for the speech signal.

The process 600 includes comparing 670 the direction of arrival and the view angle. For example, the direction of arrival and the view angle may be encoded as vectors or orientations (e.g., a set of Euler angles or a quaternion) in a common coordinate system (e.g., a coordinate system of the head-mounted display) to facilitate comparison. For example, comparing 670 the direction of arrival and the view angle may include determining an angle between the direction of arrival and the view angle. For example, comparing 670 the direction of arrival and the view angle may include determining a rotation between the direction of arrival and the view angle. For example, comparing 670 the direction of arrival and the view angle may include determining a difference between the direction of arrival and the view angle. If the comparison indicates that the direction of arrival and the view angle are closely aligned (e.g., within a threshold), that may indicate that the person detected 620 is speaking.

The process 600 includes detecting 680 a hail event based on the comparison of the direction of arrival and the view angle. In some implementations, if an angle between the direction of arrival and the view angle is below a threshold, then a hail event is detected 680. In some implementations, the comparison of the direction of arrival and the view angle is one of a plurality of factors considered to detect 680 the hail event. For example, a feature (e.g., an angle) based on the comparison of the direction of arrival and the view angle may be input to a machine learning module (e.g., a neural network or a support vector machine); and the hail event may be detected 680 based on an output of the machine learning module. For example, an angle between the direction of arrival and the view angle may be determined; a weighted average of the angle and metrics determined for other factors of the plurality of factors may be determined; and detect the hail event may be detected 680 based on the weighted average by comparing the weighted average to a threshold. For example, another factor based on which a hail event is detected 680 may be a gaze direction of the person detected 620. In some implementations, a face of the person is detected based at least in part on the one or more images; a gaze direction of the person with respect to the head-mounted display is determined; and the hail event is detected 680 based on the gaze direction.

The process 600 includes responsive to the hail event, invoking 690 an alert using the head-mounted display (e.g., the head-mounted display 410). In some implementations, the alert includes transitioning audio played on headphones of the head-mounted display from immersive virtual reality audio to transparent audio that overlays audio captured using a microphone (e.g., the one or more microphones 350) on virtual reality audio. In some implementations, the alert includes transitioning video displayed in the head-mounted display from immersive virtual reality video to transparent video that overlays video captured using the one or more sensors on virtual reality video. In some implementations, the alert includes playing an audio alert message on the headphones to announce the person. In some implementations, the alert includes displaying a visual alert message (e.g., a picture of the person detected 620) in the head-mounted display. For example, the process 1000 of FIG. 10 may be implemented to invoke 690 an alert using the head-mounted display. For example, invoking 690 the alert may include transmitting data and/or a command to the head-mounted display via a communications link (e.g. the wireless communications link 425) to cause the head-mounted display to present the alert.

FIG. 7 is a flowchart of an example of a process 700 for facilitating hailing of a user wearing a head-mounted display by detecting a hail event based recognition of a known face. The process 700 includes accessing 710 an image captured using an image sensor; detecting 720, based at least in part on the image, a person within a distance of the head-mounted display; recognizing 730, based at least in part on the image, a face of the person as associated with a known person of interest; detecting 740 a hail event based on the recognition of the face; and responsive to the hail event, invoking 750 an alert using the head-mounted display. For example, the process 700 may be implemented by the system 300 of FIG. 3. For example, the process 700 may be implemented by the system 400 of FIG. 4.

The process 700 includes accessing 710 one or more images captured using one or more image sensors (e.g., the one or more image sensors 330 or the one or more image sensors 490). The one or more images may depict an area in the vicinity of a user wearing a head-mounted display (e.g., the head-mounted display 410). For example, an image may be accessed 710 by reading directly from an image sensor, by reading the image from memory or another storage device, or by receiving the image via a communications link (e.g., the wireless communications link 425) with another device.

The process 700 includes detecting 720, based at least in part on the one or more images, a person within a distance of the head-mounted display. For example, computer vision processing (e.g., using a convolutional neural network) may be applied to the one or more images to detect 720 a person appearing in the one or more images.

The process 700 includes recognizing 730, based at least in part on the one or more images, a face of the person as associated with a known person of interest. For example, the known person of interest (e.g., a relative, a friend, or a colleague of a user wearing the head-mounted display) may have registered their face with a system implementing the process 700. For example, face detection and recognition software (e.g., using a convolutional neural network) may be applied to recognize 730 the face of the person detected 720.

The process 700 includes detecting 740 a hail event based on the recognition of the face. The fact that a known person of interest has entered the vicinity of the user wearing the head-mounted display may warrant a hail event to alert the user to the presence of the known person. In some implementations, a hail event is detected 740 when the person is detected 720 and their face is recognized 730. In some implementations, the recognition of the face of the person is one of a plurality of factors considered to detect 740 the hail event. For example, recognizing 730 the face of the person detected 720 may be a necessary but insufficient condition to trigger a hail event, so that the user not disturbed by people they have not identified as of interest. In some implementations, recognition of the face is given factor weight that allows it to be combined with other factors to detect 740 a hail event. For example, another factor based on which a hail event is detected 740 may be a gaze direction of the person detected 720. In some implementations, a face of the person is detected based at least in part on the one or more images; a gaze direction of the person with respect to the head-mounted display is determined; and the hail event is detected 740 based on the gaze direction. For example, another factor based on which a hail event is detected 740 may be an audio trigger. In some implementations, a microphone is configured to capture sound in a vicinity of the head-mounted display, which may be encoded in an audio signal. The audio signal may be accessed and a speech signal may be detected based at least in part on the audio signal. An audio trigger (e.g., a phrase such as "excuse me" or a name of the user wearing the head-mounted display) that is indicative of a hail event may be recognized in the speech signal. The hail event may be detected 740 based on recognition of the audio trigger.

The process 700 includes responsive to the hail event, invoking 750 an alert using the head-mounted display (e.g., the head-mounted display 410). In some implementations, the alert includes transitioning audio played on headphones of the head-mounted display from immersive virtual reality audio to transparent audio that overlays audio captured using a microphone (e.g., the one or more microphones 350) on virtual reality audio. In some implementations, the alert includes transitioning video displayed in the head-mounted display from immersive virtual reality video to transparent video that overlays video captured using the one or more sensors on virtual reality video. In some implementations, the alert includes playing an audio alert message on the headphones to announce the person. In some implementations, the alert includes displaying a visual alert message (e.g., a picture of the person detected 720) in the head-mounted display. For example, the process 1000 of FIG. 10 may be implemented to invoke 750 an alert using the head-mounted display. For example, invoking 750 the alert may include transmitting data and/or a command to the head-mounted display via a communications link (e.g. the wireless communications link 425) to cause the head-mounted display to present the alert.

FIG. 8 is a flowchart of an example of a process 800 for facilitating hailing of a user wearing a head-mounted display by detecting a hail event based on recognition of an audio trigger. The process 800 includes accessing 810 an audio signal captured using a microphone; detecting 820, based at least in part on the audio signal, a speech signal; recognizing 830 an audio trigger in the speech signal; detecting 840 a hail event based on recognition of the audio trigger; and responsive to the hail event, invoking 850 an alert using the head-mounted display. For example, the process 800 may be implemented by the system 300 of FIG. 3. For example, the process 800 may be implemented by the system 400 of FIG. 4.

The process 800 includes accessing 810 one or more audio signals captured using one or more microphones (e.g., the one or more microphones 350 or the one or more microphones 492). The one or more audio signals may be recordings of sound in a vicinity of a head-mounted display (e.g., the head-mounted display 120). For example, an audio signal may be accessed 810 by reading directly from a microphone, by reading the audio signal from memory or another storage device, or by receiving the audio signal via a communications link (e.g., the wireless communications link 425) with another device.

The process 800 includes detecting 820, based at least in part on the one or more audio signals, a speech signal. For example, speech recognition processing (e.g., implemented using a hidden Markov model and/or a neural network) may be applied to the one or more audio signals to identify a speech signal in the one or more audio signals. For example, a machine learning module (e.g., a neural network) may be trained to identify and isolate a speech signal within an audio signal.

The process 800 includes recognizing 830 an audio trigger in the speech signal. In some implementations, a set of known audio triggers may be maintained and audio triggers can be recognized 830 when they occur in a speech signal that has been detected 820. For example, the set of known audio triggers may include spoken phrases, such as "excuse me," "hello," "pardon," and/or a name of the user wearing the head-mounted display. For example, speech recognition processing (e.g., implemented using a hidden Markov model and/or a neural network) may be applied to the speech signal to recognize 830 an audio trigger.

The process 800 includes detecting 840 a hail event based on recognition of the audio trigger. The speaking of an audio trigger in the vicinity of the user wearing the head-mounted display may warrant a hail event to alert the user to the presence of the known person. In some implementations, a hail event is detected 840 when the audio trigger is recognized 830. In some implementations, the recognition of the audio trigger is one of a plurality of factors considered to detect 840 the hail event. For example, recognizing 830 the audio trigger may be a necessary but insufficient condition to trigger a hail event, so that the user not disturbed by most conversations occurring in their vicinity. In some implementations, recognition of an audio trigger is given a factor weight that allows it to be combined with other factors to detect 840 a hail event. For example, another factor based on which a hail event is detected 840 may be a gaze direction of a person detected in the vicinity of the user wearing the head-mounted display. In some implementations, a face of the person is detected based at least in part on one or more images; a gaze direction of the person with respect to the head-mounted display is determined; and the hail event is detected 840 based on the gaze direction.

The process 800 includes, responsive to the hail event, invoking 850 an alert using the head-mounted display (e.g., the head-mounted display 410). In some implementations, the alert includes transitioning audio played on headphones of the head-mounted display from immersive virtual reality audio to transparent audio that overlays audio captured using a microphone (e.g., the one or more microphones 350) on virtual reality audio. In some implementations, the alert includes transitioning video displayed in the head-mounted display from immersive virtual reality video to transparent video that overlays video captured using the one or more sensors on virtual reality video. In some implementations, the alert includes playing an audio alert message on the headphones to announce the person. In some implementations, the alert includes displaying a visual alert message (e.g., a picture of the person detected 720) in the head-mounted display. For example, the process 1000 of FIG. 10 may be implemented to invoke 850 an alert using the head-mounted display. For example, invoking 850 the alert may include transmitting data and/or a command to the head-mounted display via a communications link (e.g. the wireless communications link 425) to cause the head-mounted display to present the alert.

In some implementations (not shown in FIG. 8), the set of audio triggers detected may be expanded to include non-speech sounds. For example, the set of known audio triggers may include known alarm sounds, such as fire alarm or an oven buzzer.

FIG. 9 is a flowchart of an example of a process 900 for facilitating hailing of a user wearing a head-mounted display by detecting a hail event based on face orientation of another person. An estimate of an orientation of a face may indicate the extent to which the person is facing the user and attempting to address the user. The process 900 includes accessing 910 an image captured using an image sensor; detecting 920, based at least in part on the image, a face of a person; determining 930 an estimate of an orientation of the face with respect to the head-mounted display; detecting 940 the hail event based on the estimate of the orientation of the face; and responsive to the hail event, invoking 950 an alert using the head-mounted display. For example, the process 900 may be implemented by the system 300 of FIG. 3. For example, the process 900 may be implemented by the system 400 of FIG. 4.

The process 900 includes accessing 910 one or more images captured using one or more image sensors (e.g., the one or more image sensors 330 or the one or more image sensors 490). The one or more images may depict an area in the vicinity of a user wearing a head-mounted display (e.g., the head-mounted display 410). For example, an image may be accessed 910 by reading directly from an image sensor, by reading the image from memory or another storage device, or by receiving the image via a communications link (e.g., the wireless communications link 425) with another device.

The process 900 includes detecting 920, based at least in part on the image, a face of a person within a distance of the head-mounted display. For example, computer vision processing (e.g., using a convolutional neural network) may be applied to the one or more images to detect 920 a face appearing in the one or more images.

The process 900 includes determining 930 an estimate of an orientation of the face with respect to the head-mounted display. In some implementations, determining 930 an estimate of the orientation of the face may include determining a measure of symmetry of a projection of the face appearing in the image; and determining the estimate of the orientation of the face based on the measure of symmetry. For example, when a person is facing directly at the user, the face of the person may appear symmetric in an image captured from the perspective of the user (e.g., captured using an image sensor on the head-mounted display or otherwise located on or near the body of the user). In contrast, when the person is facing away from the user, the face may appear more asymmetric in an image captured from the perspective of the user. For example, if the face is turned far enough away from the user, only one eye may be visible in a captured image. In some implementations, the estimate of orientation of the face is determined 930 as a set of Euler angles or a quaternion in a coordinate system of the head-mounted display. In some implementations, the estimate of the orientation of the face is stored as an angle with respect to a view angle from the head-mounted display to the person. In some implementations, where the one or more image sensors are not attached to the head-mounted display, motion data for the head mounted display may be used to determine a relative position and/or orientation of head-mounted display to the one or more image sensors and to translate the estimate of the orientation of the face to an orientation in a coordinate system of the head-mounted display.

The process 900 includes detecting 940 a hail event based on the estimate of the orientation of the face. The fact that a person in the vicinity of the user wearing the head-mounted display is facing toward the user may warrant a hail event to alert the user to the presence of the person who may be addressing the user. In some implementations, a hail event is detected 940 when the estimate of the orientation of the face is within a threshold angle of a facing directly toward the user. In some implementations, the estimate of the orientation of the face is one of a plurality of factors considered to detect 940 the hail event. In some implementations, the estimate of the orientation of the face is input to a machine learning module (e.g., a neural network) that is used to detect 940 hail events. In some implementations, the estimate of the orientation of the face is given a factor weight that allows it to be combined with other factors to detect 940 a hail event. For example, another factor based on which a hail event is detected 940 may be a gaze direction of the person whose face has been detected 920. In some implementations, a gaze direction of the person with respect to the head-mounted display is determined; and the hail event is detected 940 based on the gaze direction. For example, another factor based on which a hail event is detected 940 may be an audio trigger. In some implementations, a microphone is configured to capture sound in a vicinity of the head-mounted display, which may be encoded in an audio signal. The audio signal may be accessed and a speech signal may be detected based at least in part on the audio signal. An audio trigger (e.g., a phrase such as "excuse me" or a name of the user wearing the head-mounted display) that is indicative of a hail event may be recognized in the speech signal. The hail event may be detected 940 based on recognition of the audio trigger.

The process 900 includes responsive to the hail event, invoking 950 an alert using the head-mounted display (e.g., the head-mounted display 410). In some implementations, the alert includes transitioning audio played on headphones of the head-mounted display from immersive virtual reality audio to transparent audio that overlays audio captured using a microphone (e.g., the one or more microphones 350) on virtual reality audio. In some implementations, the alert includes transitioning video displayed in the head-mounted display from immersive virtual reality video to transparent video that overlays video captured using the one or more sensors on virtual reality video. In some implementations, the alert includes playing an audio alert message on the headphones to announce the person. In some implementations, the alert includes displaying a visual alert message (e.g., a picture of the person detected 920) in the head-mounted display. For example, the process 1000 of FIG. 10 may be implemented to invoke 950 an alert using the head-mounted display. For example, invoking 950 the alert may include transmitting data and/or a command to the head-mounted display via a communications link (e.g. the wireless communications link 425) to cause the head-mounted display to present the alert.

FIG. 10 is a flowchart of an example of a process 1000 for alerting a user of a head-mounted display (e.g., the head-mounted display 120) of a hail event. The process 1000 includes playing 1010 an audio alert message on headphones of the head-mounted display; displaying 1020 a visual alert message in the head-mounted display; transitioning 1030 audio played on the headphones from immersive virtual reality audio to transparent audio that overlays audio captured using the microphone on virtual reality audio; and transitioning 1040 video displayed in the head-mounted display from immersive virtual reality video to transparent video that overlays video captured using the image sensor on virtual reality video. For example, the process 1000 may be implemented by the system 300 of FIG. 3. For example, the process 1000 may be implemented by the system 400 of FIG. 4.

The process 1000 includes playing 1010 an audio alert message on the headphones (e.g., the speakers 420) to announce a person. For example, the audio alert message may state a name of the person, if known, or may simply state that "your attention is requested." In some implementations, the audio alert message includes a speech signal that was detected and used to detect the hail event. For example, a recording of an audio trigger that was recognized may be played 1010.

The process 1000 includes displaying 1020 a visual alert message in the head-mounted display (e.g., with the display 416). For example, the visual alert message may include text, such as a name of the person, if known, or may simply state that "your attention is requested." In some implementations, the visual alert message includes a transcription of a speech signal that was detected and used to detect the hail event. For example, a transcription of an audio trigger that was recognized may be played 1010. In some implementations, the visual alert message includes an image of the person (e.g., cropped from an image captured using an image sensor attached to the head-mounted display).

The process 1000 includes transitioning 1030 audio played on the headphones (e.g., the speakers 420) from immersive virtual reality audio to transparent audio that overlays audio captured using the microphone on virtual reality audio. For example, the volume of a virtual reality audio signal may be reduced and an audio signal recorded with microphone may be played in real-time on the headphones at an equal or higher volume than the virtual reality audio signal.

The process 1000 includes transitioning 1040 video displayed in the head-mounted display (e.g., the head-mounted display 410) from immersive virtual reality video to transparent video that overlays video captured using the image sensor on virtual reality video. In some implementations, the video displayed is transitioned 1040 by electronically overlaying two video signals (e.g., one signal generated by a virtual reality application and one signal captured using one or more image sensors and displayed in real-time) to determine a digital overlaid video signal and then presenting the digital overlaid video signal in a display (e.g., the display 416) of the head-mounted display. In some implementations, the video displayed is transitioned 1040 by changing the optical properties of a display (e.g., the display 416) of the head-mounted display to allow more light from a surrounding environment to reach the eyes of the user wearing the head-mounted display. For example, a lens of the display may be used as an optical combiner. For example, the transparency of a lens of the display may be adjusted by adjusting a current applied to a film on the lens.

In some implementations (not shown in FIG. 10), the process 1000 may be modified to omit operations (e.g., using one of the operations or some other subset of the operations to provide an alert of a hailing event to a user.

A first implementation is a system that includes: a head-mounted display; an image sensor configured to capture images of a vicinity of the head-mounted display; a microphone configured to capture sound in a vicinity of the head-mounted display; and a processing apparatus configured to: access an image captured using the image sensor; detect, based at least in part on the image, a person within a distance of the head-mounted display; determine a view angle to the person; access an audio signal captured using the microphone; detect, based at least in part on the audio signal, a speech signal; determine a direction of arrival of the speech signal; compare the direction of arrival and the view angle; detect a hail event based on the comparison of the direction of arrival and the view angle; and responsive to the hail event, invoke an alert using the head-mounted display.

The system of the first implementation, wherein the processing apparatus may be configured to: recognize, based at least in part on the image, a face of the person as associated with a known person of interest; and detect the hail event based on the recognition of the face.

The system of the first implementation, wherein the processing apparatus may be configured to: detect, based at least in part on the image, a face of the person; determine an estimate of an orientation of the face with respect to the head-mounted display; and detect the hail event based on the estimate of the orientation of the face. Determining an estimate of the orientation of the face may include performing operations including: determining a measure of symmetry of a projection of the face appearing in the image; and determining the estimate of the orientation of the face based on the measure of symmetry. The estimate of the orientation of the face may be stored as an angle with respect to a view angle from the head-mounted display to the person.

The system of the first implementation, wherein the processing apparatus may be configured to: detect, based at least in part on the image, a face of the person; determine a gaze direction of the person with respect to the head-mounted display; and detect the hail event based on the gaze direction.

The system of the first implementation, wherein the processing apparatus may be configured to: recognize an audio trigger in the speech signal; and detect the hail event based on recognition of the audio trigger.

The system of the first implementation, the comparison of the direction of arrival and the view angle is one of a plurality of factors considered to detect the hail event, and wherein the processing apparatus may be configured to: input a feature based on the comparison of the direction of arrival and the view angle to a machine learning module; and detect the hail event based on an output of the machine learning module.

The system of the first implementation, wherein the comparison of the direction of arrival and the view angle is one of a plurality of factors considered to detect the hail event, and wherein the processing apparatus may be configured to: determine an angle between the direction of arrival and the view angle; determine a weighted average of the angle and metrics determined for other factors of the plurality of factors; and detect the hail event based on the weighted average by comparing the weighted average to a threshold.

The system of the first implementation, wherein the head-mounted display includes headphones and the alert includes: a transition of audio played on the headphones from immersive virtual reality audio to transparent audio that overlays audio captured using the microphone on virtual reality audio.

The system of the first implementation, wherein the alert includes: a transition of video displayed in the head-mounted display from immersive virtual reality video to transparent video that overlays video captured using the image sensor on virtual reality video.

The system of the first implementation, wherein the head-mounted display includes headphones and the alert includes: playing an audio alert message on the headphones to announce the person. The audio alert message may include the speech signal.

The system of the first implementation, wherein the alert includes: displaying a visual alert message in the head-mounted display. The visual alert message may include an image of the person.

A second implementation is a system that includes: a head-mounted display; an image sensor configured to capture images of a vicinity of the head-mounted display; and a processing apparatus configured to: access an image captured using the image sensor; detect, based at least in part on the image, a person within a distance of the head-mounted display; recognize, based at least in part on the image, a face of the person as associated with a known person of interest; detect a hail event based on the recognition of the face; and responsive to the hail event, invoke an alert using the head-mounted display.

The system of the second implementation, wherein the processing apparatus is configured to: determine an estimate of an orientation of the face with respect to the head-mounted display; and detect the hail event based on the estimate of the orientation of the face.

The system of the second implementation, wherein the processing apparatus is configured to: determine a gaze direction of the person with respect to the head-mounted display; and detect the hail event based on the gaze direction.

The system of the second implementation, comprising a microphone configured to capture sound in a vicinity of the head-mounted display, and wherein the processing apparatus is configured to: access an audio signal captured using the microphone; detect, based at least in part on the audio signal, a speech signal; recognize an audio trigger in the speech signal; and detect the hail event based on recognition of the audio trigger.

The system of the second implementation, wherein the head-mounted display includes a microphone and headphones and the alert includes: a transition of audio played on the headphones from immersive virtual reality audio to transparent audio that overlays audio captured using the microphone on virtual reality audio.

The system of the second implementation, wherein the alert includes: a transition of video displayed in the head-mounted display from immersive virtual reality video to transparent video that overlays video captured using the image sensor on virtual reality video.

A third implementation is a system that includes: a head-mounted display; a microphone configured to capture sound in a vicinity of the head-mounted display; and a processing apparatus configured to: access an audio signal captured using the microphone; detect, based at least in part on the audio signal, a speech signal; recognize an audio trigger in the speech signal; detect a hail event based on recognition of the audio trigger; and responsive to the hail event, invoke an alert using the head-mounted display.

The system of the third implementation, comprising an image sensor configured to capture images of a vicinity of the head-mounted display, and wherein the processing apparatus is configured to: access an image captured using the image sensor; detect, based at least in part on the image, a face of a person; determine an estimate of an orientation of the face with respect to the head-mounted display; and detect the hail event based on the estimate of the orientation of the face.

The system of the third implementation, comprising an image sensor configured to capture images of a vicinity of the head-mounted display, and wherein the processing apparatus is configured to: access an image captured using the image sensor; detect, based at least in part on the image, a face of a person; determine a gaze direction of the person with respect to the head-mounted display; and detect the hail event based on the gaze direction.

The system of the third implementation, wherein the head-mounted display includes headphones and the alert includes: a transition of audio played on the headphones from immersive virtual reality audio to transparent audio that overlays audio captured using the microphone on virtual reality audio.

As described above, one aspect of the present technology is the gathering and use of data available from various sources to improve a user's computer-generated reality experience. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to identify events of interest to a user that may trigger a hail event. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide identifying information for friends. In yet another example, users can select to limit the length of time personal data is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, hailing events can be detecting without using data regarding user friends or interests based on non-personal information data or a bare minimum amount of personal information, such as the content being requested by the device associated with a user, other non-personal information available to the computer-generated reality system, or publicly available information.

What is claimed is:

1. A system comprising:
a head-mounted display;
an image sensor attached to the head-mounted display;
a microphone attached to the head-mounted display; and
a processing apparatus configured to:
    access an image captured using the image sensor;
    detect, based at least in part on the image, a person outside of the head-mounted display;
    determine a view angle to the person;
    access an audio signal captured using the microphone;
    detect, based at least in part on the audio signal, a speech signal;
    determine a direction of arrival of the speech signal;
    detect whether a hail criteria is satisfied, wherein the hail criteria comprises a determination the person is speaking based on comparing the direction of arrival and the view angle; and
    responsive to a determination that the hail criteria is satisfied, invoke an alert using the head-mounted display.

2. The system of claim 1, wherein the processing apparatus is configured to:
determine whether a face of the person in the image is associated with a person of interest, and wherein the hail criteria further comprises a determination that the face of the person in the image is associated with the person of interest.

3. The system of claim 1, wherein the processing apparatus is configured to:
detect, based at least in part on the image, a face of the person; and determine an estimate of an orientation of the face with respect to the head-mounted display, wherein the hail criteria further comprises a determination that the orientation of the face with respect to the head-mounted display is within a range of orientations.

4. The system of claim 3, wherein the processing apparatus is configured to determine an estimate of the orientation of the face by performing operations including:
determining a measure of symmetry of a projection of the face appearing in the image; and
determining the estimate of the orientation of the face based on the measure of symmetry.

5. The system of claim 1, wherein the processing apparatus is configured to:
detect, based at least in part on the image, a face of the person; and
determine a gaze direction of the person with respect to the head-mounted display, wherein the hail criteria further comprises a determination that the gaze direction is within a range of directions with respect to the head-mounted display.

6. The system of claim 1, wherein the processing apparatus is configured to:
recognize an audio trigger in the speech signal, wherein the hail criteria further comprises a determination that the audio trigger has been detected.

7. The system of claim 1, wherein the head-mounted display is operatively coupled to headphones and wherein invoking the alert comprises:
playing, using the headphones, audio captured by the microphone concurrently with audio content corresponding to a computer-generated reality environment displayed by the head-mounted display.

8. The system of claim 1, wherein invoking the alert comprises:
displaying, using the head-mounted display, video captured using the image sensor concurrently with video content corresponding to a computer-generated reality environment displayed by the head-mounted display.

9. The system of claim 1, wherein the head-mounted display is operatively coupled to headphones and wherein invoking the alert comprises:
playing an audio alert message on the headphones to announce the person.

10. The system of claim 9, wherein the audio alert message includes the speech signal.

11. The system of claim 1, wherein invoking the alert comprises:
displaying a visual alert message in the head-mounted display.

12. A method comprising:
accessing an audio signal captured using a microphone attached to a head-mounted display;
detecting, based at least in part on the audio signal, a speech signal;
recognizing an audio trigger in the speech signal;
accessing an image captured using an image sensor attached to the head-mounted display;
detecting, based at least in part on the image, a face of a person;
determining an estimate of an orientation of the face with respect to the head-mounted display;
detecting a hail event based on recognition of the audio trigger and based on the estimate of the orientation of the face; and
responsive to the hail event, invoking an alert using the head-mounted display.

13. The method of claim 12, comprising:
detecting, based at least in part on the image, a face of a person;
determining a gaze direction of the person with respect to the head-mounted display; and
detecting the hail event based on the gaze direction.

14. The method of claim 12, wherein the alert includes:
a transition of audio played on headphones of the head-mounted display from immersive virtual reality audio to transparent audio that overlays audio captured using the microphone on virtual reality audio.

15. The method of claim 12, wherein determining the estimate of the orientation of the face comprises:
determining a measure of symmetry of a projection of the face appearing in the image; and
determining the estimate of the orientation of the face based on the measure of symmetry.

16. A system comprising:
a head-mounted display;
an image sensor attached to the head-mounted display; and
a processing apparatus configured to:
access an image captured using the image sensor;
detect, based at least in part on the image, a face of a person;
determine an estimate of an orientation of the face with respect to the head-mounted display, wherein the processing apparatus is configured to determine the estimate of the orientation of the face by performing operations including determining a measure of symmetry of a projection of the face appearing in the image and determining the estimate of the orientation of the face based on the measure of symmetry;
detect a hail event based on the estimate of the orientation of the face; and
responsive to the hail event, invoke an alert using the head-mounted display.

17. The system of claim 16, wherein the processing apparatus is configured to:
determine whether the face of the person in the image is associated with a person of interest; and
detect the hail event based on the face being associated with a person of interest.

18. The system of claim 16, wherein the processing apparatus is configured to:
determine a gaze direction of the person with respect to the head-mounted display; and
detect the hail event based on the gaze direction.

19. The system of claim 16, wherein invoking the alert comprises:
displaying, using the head-mounted display, video captured using the image sensor concurrently with video content corresponding to a computer-generated reality environment displayed by the head-mounted display.

20. The system of claim 16, wherein the alert includes:
a transition of audio played on headphones of the head-mounted display from immersive virtual reality audio to transparent audio that overlays audio captured using the microphone on virtual reality audio.

* * * * *